(12) United States Patent
Yeo et al.

(10) Patent No.: US 11,018,806 B2
(45) Date of Patent: *May 25, 2021

(54) DATA MAPPING METHOD AND APPARATUS IN WIRELESS COMMUNICATION SYSTEM

(71) Applicant: Samsung Electronics Co., Ltd., Suwon-si (KR)

(72) Inventors: Jeongho Yeo, Suwon-si (KR); Sungjin Park, Suwon-si (KR); Jinyoung Oh, Suwon-si (KR); Hyojin Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/907,982

(22) Filed: Jun. 22, 2020

(65) Prior Publication Data

US 2020/0322088 A1 Oct. 8, 2020

Related U.S. Application Data

(63) Continuation of application No. 16/199,929, filed on Nov. 26, 2018, now Pat. No. 10,693,591.

(30) Foreign Application Priority Data

Nov. 24, 2017 (KR) .......................... 10-2017-0158966

(51) Int. Cl.
*H04L 1/00* (2006.01)
*H04L 5/00* (2006.01)
(Continued)

(52) U.S. Cl.
CPC .......... *H04L 1/0058* (2013.01); *H04L 1/0061* (2013.01); *H04L 1/1812* (2013.01);
(Continued)

(58) Field of Classification Search
None
See application file for complete search history.

(56) References Cited

U.S. PATENT DOCUMENTS

| 8,266,513 B2 | 9/2012 | Kim et al. |
| 10,693,591 B2 * | 6/2020 | Yeo .......................... H04W 4/70 |

(Continued)

FOREIGN PATENT DOCUMENTS

WO 2017-192072 A1 11/2017

OTHER PUBLICATIONS

NTT Docomo, Inc.; Signalling design for CBG-based (re)transmission; 3GPP TSG RAN WG1 Meeting 90bis; Discussion and Decision; R1-1718218; Oct. 9-13, 2017, Prague, CZ.
(Continued)

*Primary Examiner* — Brian S Roberts
(74) *Attorney, Agent, or Firm* — Jefferson IP Law, LLP

(57) ABSTRACT

A method, performed by a base station, of transmitting and receiving data in a wireless communication system, and an apparatus therefor are provided. The method includes determining whether a code block (CB), one of a plurality of CBs included in a transport block (TB), is scheduled for a transmission based on code block group transmission information (CBGTI), in response to the CB being scheduled for the transmission, determining a length of a sequence for the CB based on a number of CBs of the TB or a number of scheduled CBs of the TB, generating the sequence for the CB according to the determined length of the sequence, and transmitting a signal including the generated sequence.

12 Claims, 12 Drawing Sheets

(51) Int. Cl.
*H04L 25/02* (2006.01)
*H04W 4/70* (2018.01)
*H04L 1/18* (2006.01)
*H04L 5/14* (2006.01)
*H04W 72/04* (2009.01)

(52) U.S. Cl.
CPC ............ *H04L 5/003* (2013.01); *H04L 5/1469* (2013.01); *H04L 25/02* (2013.01); *H04W 4/70* (2018.02); *H04W 72/042* (2013.01); *H04L 5/0055* (2013.01)

(56) References Cited

U.S. PATENT DOCUMENTS

| | | |
|---|---|---|
| 2008/0316977 A1 | 12/2008 | Malladi |
| 2009/0077456 A1 | 3/2009 | Pi et al. |
| 2019/0207734 A1 | 7/2019 | Yang et al. |
| 2020/0028627 A1 | 1/2020 | Andersson et al. |

OTHER PUBLICATIONS

Nokia, Nokia Shanghai Bell; On CBG based transmissions; 3GPP TSG RAN WG1 Meeting 90bis; Discussion and Decision; R1-1718622; Oct. 9-13, 2017, Prague, CZ.

Ericsson; On TBS Determination and DL/UL Resource Allocation; 3GPP TSG RAN WG1 Meeting 91; Discussion and Decision; R1-1719596; Nov. 27-Dec. 1, 2017, Reno, USA.

LG Electronics; Discussion on resource allocation and TBS determination; 3GPP TSG RAN WG1 Meeting 91; Discussion and decision; R1-1719929; Nov. 27-Dec. 1, 2017, Reno, USA.

International Search Report dated Mar. 12, 2019, issued in International application No. PCT/KR2018/014586.

Extended European Search Report dated Nov. 18, 2020, issued in a counterpart European Application No. 18881834.8-1220/3695537.

LG Electronics; Discussion on resource allocation and TBS determination; 3GPP TSG RAN WG1 Meeting 90bis R1-1717965; Oct. 13, 2017, Prague, CZ.

LG Electronics; Remaining aspects of CBG based retransmission for NR; 3GPP TSG RAN WG1 Meeting #91; R1-1719931; Nov. 18, 2017, Reno, USA.

Samsung: "WF on length of rate matching output sequence", 3GPP Draft; RI-1721459 WF on Length of Rate Matching Sequence Output VI, 3RD Generation Partnership Project (3GPP), Mobile Competence Centre; 650, Route Des Lucioles ; F-06921 Sophia-Antipolis Cedex, vol. RAN WGI, No. Reno, USA; Nov. 27, 2017-Dec. 1, 2017, Nov. 28, 2017 (Nov. 28, 2017), XP051370455.

\* cited by examiner

CHANNEL CODING BLOCK DIAGRAM
IN WHICH OUTER CODE IS NOT USED

CHANNEL CODING BLOCK DIAGRAM IN WHICH OUTER CODE IS USED

DATA MAPPING METHOD AND APPARATUS IN WIRELESS COMMUNICATION SYSTEM

CROSS-REFERENCE TO RELATED APPLICATION(S)

This application is a continuation application of prior application Ser. No. 16/199,929, filed on Nov. 26, 2018, which has issued as U.S. Pat. No. 10,693,591 on Jun. 23, 2020, and was based on and claimed priority under 35 U.S.C. § 119(a) of a Korean patent application number 10-2017-0158966, filed on Nov. 24, 2017, in the Korean Intellectual Property Office, the disclosure of which is incorporated by reference herein in its entirety.

BACKGROUND

1. Field

The disclosure relates to data mapping methods and apparatuses in a wireless communication system. More particularly, the disclosure relates to a data mapping method and apparatus for smoothly providing a service in a wireless communication system.

2. Description of Related Art

To meet the increase in demand for wireless data traffic after the commercialization of 4th generation (4G) communication systems, considerable efforts have been made to develop pre-5th generation (5G) communication systems or 5G communication systems. This is one reason why "5G communication systems" or "pre-5G communication systems" are called "beyond 4G network communication systems" or "post long-term evolution (LTE) systems". In order to achieve a high data transmission rate, 5G communication systems are being developed to be implemented in a super-high frequency band (millimeter wave (mmWave)), e.g., a band of 60 GHz. In order to reduce the occurrence of stray electric waves in such a super-high frequency band and to increase a transmission distance of electric waves in 5G communication systems, various technologies are being studied, for example, beamforming, massive multiple input multiple output (MIMO), full dimensional MIMO (FD-MIMO), array antennas, analog beam-forming, and large scale antennas. In order to improve system networks for 5G communication systems, various technologies have been developed, including evolved small cells, advanced small cells, cloud radio access networks (cloud RAN), ultra-dense networks, device-to-device communication (D2D), wireless backhaul, moving networks, cooperative communication, coordinated multi-points (CoMP), and interference cancellation. Also, for 5G communication systems, other technologies have been developed, including hybrid modulation of frequency-shift keying (FSK) and quadrature amplitude modulation (QAM) (FQAM) and sliding window superposition coding (SWSC), which are advanced coding modulation (ACM) schemes, and filter bank multi carrier (FBMC), non-orthogonal multiple access (NOMA), and sparse code multiple access (SCMA), which are advanced access schemes.

The internet has evolved from a human-based connection network, where humans create and consume information, to the internet of things (IoT), where distributed configurations, such as objects, exchange information with each other to process the information. Internet of everything (IoE) technology is being newly provided, in which technology related to the IoT is combined with, for example, technology for processing big data through connection with a cloud server. In order to implement the IoT, various technical components are required, such as, a sensing technique, wired/wireless communication and network infrastructures, a service interfacing technique, a security technique, etc. In recent years, techniques including a sensor network for connecting objects, machine to machine (M2M) communication, machine type communication (MTC), etc. have been studied. In the IoT environment, intelligent internet technology (IT) services may be provided to collect and analyze data obtained from objects connected to each other and thus to create new value in human life. As existing information technology (IT) techniques and various industries converge and combine with each other, the IoT may be applied to various fields, such as smart homes, smart buildings, smart cities, smart cars or connected cars, smart grids, health care, smart home appliances, high quality medical services, etc.

Various attempts are being made to apply 5G communication systems to the IoT network. For example, technologies related to sensor networks, M2M communication, MTC, etc., are implemented by using 5G communication technology including beam-forming, MIMO, array antenna, etc. The application of the cloud RAN as a big data processing technique described above may be an example of convergence of 5G communication technology and IoT technology.

As described above, with the development of wireless communication systems, various services are now providable, and thus, a way of smoothly providing these services is required.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide data mapping methods and apparatuses for smoothly providing a service in a wireless communication system.

In accordance with an aspect of the disclosure, a method, performed by a base station, of transmitting and receiving data in a wireless communication system is provided. The method includes determining whether a code block (CB), one of a plurality of CBs included in a transport block (TB), is scheduled for a transmission based on code block group transmission information (CBGTI), in response to the CB being scheduled for the transmission, determining a length of a sequence for the CB based on a number of CBs of the TB or a number of scheduled CBs of the TB, generating the sequence for the CB according to the determined length of the sequence, and transmitting a signal including the generated sequence.

The method may further include, in response to the CB not being scheduled for the transmission, determining the length of a sequence for the CB as 0.

The method may further include, in response to the CBGTI not being present in downlink control information (DCI) scheduling of the TB, determining the length of the sequence for the CB based on the number of CBs of the TB, and in response to the CBGTI being present in the DCI, determining the length of the sequence for the CB based on the number of scheduled CBs of the TB.

The length of the sequence for the CB may be determined as $$N_L \cdot Q_m \cdot \left\lfloor \frac{G}{N_L \cdot Q_m \cdot C'} \right\rfloor \text{ or } N_L \cdot Q_m \cdot \left\lceil \frac{G}{N_L \cdot Q_m \cdot C'} \right\rceil,$$

$N_L$ may be the number of transmission layers mapped with the TB, $Q_m$ may be the modulation order, G may be the total number of coded bits available for a transmission of the TB, C' may be the number of CBs of the TBs in response to the CBGTI being not present in the DCI, and C' may be the number of the scheduled CBs of the TBs in response to the CBGTI being present in the DCI.

In accordance with another aspect of the disclosure, a method, performed by a user equipment (UE) of transmitting and receiving data in a wireless communication system is provided. The method includes receiving code block group transmission information (CBGTI) for at least one code block (CB) included in a transport block (TB), determining a length of a sequence for the at least one CB based on the number of CBs of the TB or the number of scheduled CBs of the TB according to the CBGTI, and decoding the at least one CB based on the determined length of the sequence.

The method may further include, in response to the CBGTI not being present in downlink control information (DCI) scheduling the TB, determining the length of the sequence for the CB based on the number of CBs of the TB, and in response to the CBGTI being present in the DCI, determining the length of the sequence for the CB based on the number of scheduled CBs of the TB.

The length of the sequence for the CB may be determined as $$N_L \cdot Q_m \cdot \left\lfloor \frac{G}{N_L \cdot Q_m \cdot C'} \right\rfloor \text{ or } N_L \cdot Q_m \cdot \left\lceil \frac{G}{N_L \cdot Q_m \cdot C'} \right\rceil,$$

$N_L$ may be the number of transmission layers mapped with the TB, $Q_m$ may be the modulation order, G may be the total number of coded bits available for a transmission of the TB, C' may be the number of CBs of the TBs in response to the CBGTI being not present in the DCI, and C' may be the number of the scheduled CBs of the TBs in response to the CBGTI being present in the DCI.

In accordance with another aspect of the disclosure, a base station for transmitting and receiving data in a wireless communication system is provided. The base station includes a transceiver, at least one memory storing instructions, and at least one processor configured to execute the stored instructions to determine whether a code block (CB), one of a plurality of CBs included in a transport block (TB), is scheduled for a transmission based on code block group transmission information (CBGTI), in response to the CB being scheduled for the transmission, determine a length of a sequence for the CB based on a number of CBs of the TB or a number of scheduled CBs of the TB, generate the sequence for the CB according to the determined length of the sequence, and control the transceiver to transmit a signal including the generated sequence.

The at least one processor may further be configured to execute the stored instructions to, in response to the CB not being scheduled for the transmission, determine the length of a sequence for the CB as 0.

The at least one processor may further be configured to, in response to the CBGTI not being present in downlink control information (DCI) scheduling of the TB, determine the length of a sequence for the CB based on the number of CBs of the TB, and in response to the CBGTI being present in the DCI, determine the length of the sequence for the CB based on the number of scheduled CBs of the TB.

The length of the sequence for the CB may be determined as $$N_L \cdot Q_m \cdot \left\lfloor \frac{G}{N_L \cdot Q_m \cdot C'} \right\rfloor \text{ or } N_L \cdot Q_m \cdot \left\lceil \frac{G}{N_L \cdot Q_m \cdot C'} \right\rceil,$$

$N_L$ may be the number of transmission layers mapped with the TB, $Q_m$ may be the modulation order, G may be the total number of coded bits available for a transmission of the TB, C' may be the number of CBs of the TBs in response to the CBGTI being not present in the DCI, and C' may be the number of the scheduled CBs of the TBs in response to the CBGTI being present in the DCI.

In accordance with another aspect of the disclosure, a user equipment (UE) for transmitting and receiving data in a wireless communication system is provided. The UE includes a transceiver, at least one memory storing instructions, and at least one processor configured to execute the stored instructions to receive code block group transmission information (CBGTI) for at least one code block (CB) included in a transport block (TB), determine a length of a sequence for the at least one CB based on the number of CBs of the TB or the number of scheduled CBs of the TB according to the CBGTI, and decode the at least one CB based on the determined length of the sequence.

The at least one processor may further be configured to, in response to the CBGTI not being present in downlink control information (DCI) scheduling of the TB, determine the length of a sequence for the CB based on the number of CBs of the TB, and in response to the CBGTI being present in the DCI, determine the length of the sequence for the CB based on the number of scheduled CBs of the TB.

The length of the sequence for the CB may be determined as $$N_L \cdot Q_m \cdot \left\lfloor \frac{G}{N_L \cdot Q_m \cdot C'} \right\rfloor \text{ or } N_L \cdot Q_m \cdot \left\lceil \frac{G}{N_L \cdot Q_m \cdot C'} \right\rceil,$$

$N_L$ may be the number of transmission layers mapped with the TB, $Q_m$ may be the modulation order, G may be the total number of coded bits available for a transmission of the TB, C' may be the number of CBs of the TBs in response to the CBGTI being not present in the DCI, and C' may be the number of the scheduled CBs of the TBs in response to the CBGTI being present in the DCI.

According to another aspect of the disclosure, a non-transitory computer-readable recording medium having an executable program recorded thereon, wherein the program instructs a computer to perform the method of claim 1.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
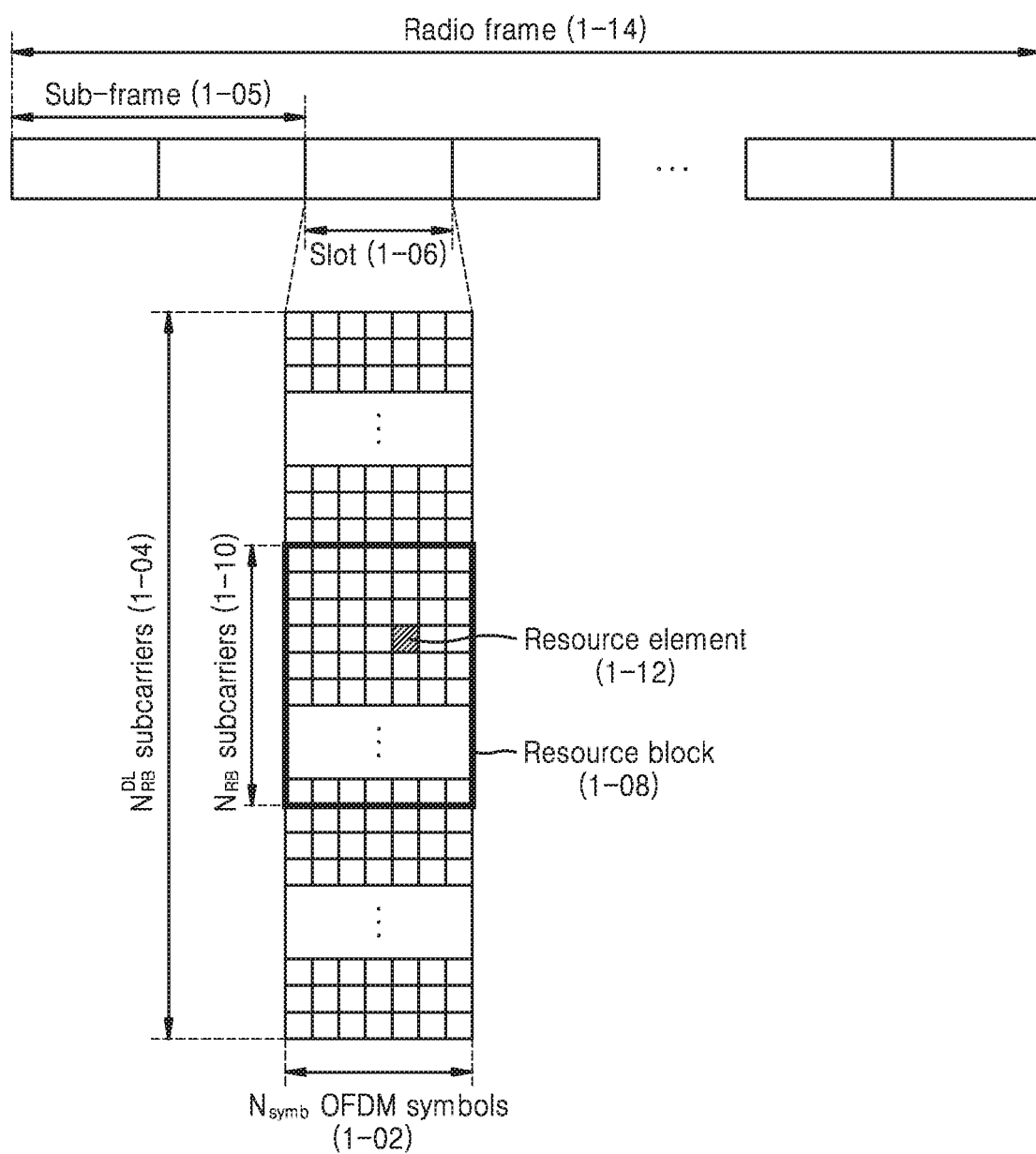
FIG. 1 is a diagram of a transmission structure of a time-frequency domain that is a downlink (DL) wireless resource region of a long-term evolution (LTE) system, an LTE-advanced (LTE-A) system, or a similar system according to an embodiment of the disclosure.

The following description with reference to accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

While describing the embodiments, technical content that is well-known in the related fields and not directly related to the disclosure will not be provided. By omitting redundant descriptions, the essence of the disclosure will not be obscured and may be clearly explained.

For the same reasons, components may be exaggerated, omitted, or schematically illustrated in drawings for clarity. Also, the size of each component does not completely reflect the actual size. In the drawings, like reference numerals denote like elements.

Expressions such as "at least one of," when preceding a list of elements, modify the entire list of elements and do not modify the individual elements of the list.

Advantages and features of one or more embodiments of the disclosure and methods of accomplishing the same may be understood more readily by reference to the following detailed description of the embodiments and the accompanying drawings. In this regard, the embodiments may have different forms and should not be construed as being limited to the descriptions set forth herein. Rather, these embodiments are provided so that this disclosure will be thorough and complete and will fully convey the concept of the embodiments to one of ordinary skill in the art, and the disclosure will only be defined by the appended claims.

Here, it will be understood that combinations of blocks in flowcharts or process flow diagrams may be performed by computer program instructions. Since these computer program instructions may be loaded into a processor of a general purpose computer, a special purpose computer, or another programmable data processing apparatus, the instructions, which are performed by a processor of a computer or another programmable data processing apparatus, create units for performing functions described in the flowchart block(s). The computer program instructions may be stored in a computer-usable or computer-readable memory capable of directing a computer or another programmable data processing apparatus to implement a function in a particular manner, and thus the instructions stored in the computer-usable or computer-readable memory may also be capable of producing manufacturing items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It should also be noted that in some alternative implementations, functions mentioned in blocks may occur out of order. For example, two blocks illustrated successively may actually be executed substantially concurrently, or the blocks may sometimes be performed in a reverse order according to the corresponding function.

The term "unit" in the embodiments of the disclosure means a software component or hardware component such as a field-programmable gate array (FPGA) or an application-specific integrated circuit (ASIC), and performs a specific function. However, the term "unit" is not limited to software or hardware. The unit may be formed so as to be in an addressable storage medium, or may be formed so as to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and units may be associated with the smaller number of components and units, or may be divided into additional components and units. Furthermore, the components and units may be embodied to reproduce one or more central processing units (CPUs) in a device or security multimedia card. Also, in the embodiments, the unit may include at least one processor.

A wireless communication system has evolved from providing initial voice-oriented services to, for example, a broadband wireless communication system providing a high-speed and high-quality packet data service, such as communication standards of high speed packet access (HSPA), long-term evolution (LTE) or evolved universal terrestrial radio access (E-UTRA), and LTE-advanced (LTE-A) of third generation partnership project (3GPP), high rate packet data (HRPD) and ultra mobile broadband (UMB) of 3GPP2, and 802.16e of Institute of Electrical and Electronics Engineers (IEEE). A $5^{th}$ generation (5G) or new radio (NR) communication standards are being developed with 5G wireless communication systems.

In an LTE system that is a representative example of the broadband wireless communication system, an orthogonal frequency division multiplexing (OFDM) scheme is used in a downlink (DL) and a single carrier frequency division multiplexing (SC-FDMA) scheme is used in an uplink (UL). The UL refers to a wireless link through which a terminal, user equipment (UE), or a mobile station (MS) transmits data or control signals to a base station (BS) or an evolved node B (eNode B), and the DL refers to a wireless link through which a BS transmits data or control signals to a terminal. In such a multiple access scheme, data or control information of each user is classified by generally assigning and operating the data or control information such that time-frequency resources for transmitting data or control information for each user do not overlap each other, i.e., such that orthogonality is established.

An LTE system employs a hybrid automatic repeat request (HARQ) scheme in which a physical layer retransmits data when a decoding failure occurs in initial transmission. In the HARQ scheme, when a receiver fails to accurately decode data, the receiver transmits information (negative acknowledgment (NACK)) indicating the decoding failure to the transmitter so that the transmitter may retransmit the corresponding data in the physical layer. The receiver combines the data retransmitted by the transmitter with the data whose previous decoding had failed so as to improve data reception performance. In addition, when the receiver accurately decodes the data, information (acknowledgment (ACK)) indicating successful decoding is transmitted to the transmitter so that the transmitter may transmit new data.

All terms including descriptive or technical terms which are used herein should be construed as having meanings that are obvious to one of ordinary skill in the art. However, the terms may have different meanings according to an intention of one of ordinary skill in the art, precedent cases, or the appearance of new technologies, and thus, the terms used herein have to be defined based on the meaning of the terms together with the description throughout the specification. Hereinafter, a BS may be a subject performing resource assignment of a terminal, and may be at least one of a gNode B, an eNode B, a Node B, a BS, a wireless access unit, a BS controller, and a node on a network. A terminal may include UE, an MS, a cellular phone, a smart phone, a computer, or a multimedia system capable of performing communication functions. In the disclosure, a DL is a wireless transmission path of a signal transmitted from a BS to a terminal, and a UL is a wireless transmission path of a signal transmitted from a terminal to a BS. Also, one or more embodiments of the disclosure will be described as an example of an LTE or LTE-A system, but the one or more embodiments may also be applied to other communication systems having a similar technical background or channel form. For example, 5G mobile communication technology (5G, new radio, NR) developed after LTE-A may be included. In addition, the one or more embodiments may be applied to other communication systems through some modifications within the scope of the disclosure without departing from the scope of the disclosure by the judgment of a person of ordinary skill in the art.

In the disclosure, a transmission time interval (TTI) may denote a unit in which a control signal and a data signal are transmitted, or denote a unit in which a data signal is transmitted. For example, a TTI in a DL of an existing LTE system is a sub-frame that is a time unit of 1 ms. Meanwhile, in the disclosure, a TTI in a UL may denote a unit in which a control signal and a data signal are transmitted, or denote a unit in which a data signal is transmitted. A TTI in a UL of the existing LTE system is also a sub-frame that is a time unit of 1 ms like the DL. Meanwhile, in a 5G or NR system, a TTI for data transmission may be a slot or a mini-slot.

Terms such as a physical channel and a signal in an existing LTE or LTE-A system may be used to describe methods and apparatuses suggested in the disclosure. However, the content of the disclosure is applied to a wireless communication system, instead of the LTE or LTE-A system.

In the disclosure, a UL scheduling approval signal and a DL data signal are referred to as a first signal. Also, in the disclosure, a UL data signal with respect to UL scheduling approval and HARQ ACK/NACK with respect to a DL data signal are referred to as a second signal. In the disclosure, among signals transmitted from a BS to a terminal, a signal expecting a response from the terminal may be the first signal and a response signal of the terminal with respect to the first signal may be the second signal. Also, in the disclosure, a service type of the first signal may be in a category of enhanced mobile broadband (eMBB), massive machine-type communications (mMTC), and ultra-reliable and low-latency communications (URLLC).

Hereinafter, in the disclosure, a TTI length of the first signal denotes a length of time taken for the first signal to be transmitted. Also, in the disclosure, a TTI length of the second signal denotes a length of time taken for the second signal to be transmitted. Also, in the disclosure, a second signal transmission timing is information about when the terminal transmits the second signal and when the BS receives the second signal, and may be referred to as a second signal transmission and reception timing.

In the disclosure, it may be understood that, generally, a frequency division duplex (FDD) system is described, unless a time division duplex (TDD) system is mentioned. However, descriptions about the FDD system may also be applied to the TDD system via simple modification.

Hereinafter, in the disclosure, a higher signaling is a method of transmitting a signal from a BS to a terminal by using a DL data channel of a physical layer or from a terminal to a BS by using a UL data channel of a physical layer, and may also be referred to as radio resource control (RRC) signaling or medium access control (MAC) control element (CE).

FIG. 1 is a diagram of a transmission structure of a time-frequency domain that is a DL wireless resource region of a LTE system or a similar system according to an embodiment of the disclosure.

Referring to FIG. 1, a horizontal axis represents a time domain and a vertical axis represents a frequency domain in a wireless resource region. In the time domain, the minimum transmission unit is an OFDM symbol, and $N_{symb}$ OFDM symbols 1-02 are gathered to constitute one slot 1-06, and two slots are gathered to constitute one sub-frame 1-05. The length of the slot is 0.5 ms, and the length of the sub-frame is 0.1 ms. A radio frame 1-14 is a time domain interval composed of 10 sub-frames. The minimum transmission unit in the frequency domain is a subcarrier, and the transmission bandwidth of the whole system is composed of $N_{RB}^{DL}$ subcarriers 1-04 in total. However, such specific numerical values may vary according to a system.

In the time-frequency domain, a basic unit of a resource is a resource element (RE) 1-12, and may be indicated as an OFDM symbol index and a subcarrier index. A resource block (RB) 1-08 or a PRB is defined as $N_{symb}$ successive OFDM symbols 1-02 in the time domain and $N_R$ successive subcarriers 1-10 in the frequency domain. Accordingly, one RB 1-08 is composed of $N_{symb} \times N_{RB}$ REs 1-12 in one slot.

In general, the minimum transmission unit of data is RB, and in the LTE system, it is general that $N_{symb}$ is 7 and $N_{RB}$ is 2, and $N_{BW}$ and $N_{RB}$ are in proportion to the system transmission bandwidth. However, a system other than the LTE system may use a different value. A data rate is increased in proportion to the number of RBs being scheduled.

In the LTE system, 6 transmission bandwidths may be defined and operated. In the case of a FDD system that divides and operates a DL and a UL through a frequency, the transmission bandwidth of the DL and the transmission bandwidth of the UL may differ from each other. A channel bandwidth indicates a radio frequency (RF) bandwidth that corresponds to the system transmission bandwidth. Table 1 presents a corresponding relationship between the system transmission bandwidth defined in the LTE system and the channel bandwidth. For example, in the LTE system having the channel bandwidth of 10 MHz, the transmission bandwidth is composed of 50 RBs.

TABLE 1

| | Channel bandwidth $BW_{Channel}$ [MHz] | | | | | |
|---|---|---|---|---|---|---|
| | 1.4 | 3 | 5 | 10 | 15 | 20 |
| Transmission bandwidth configuration $N_{RB}$ | 6 | 15 | 25 | 50 | 75 | 100 |

DL control information may be transmitted within first N OFDM symbols in a sub-frame. N={1, 2, 3} in general. Accordingly, in accordance with the amount of control information to be transmitted in a current sub-frame, the value N may be varied for each sub-frame. The control information may include a control channel transmission interval indicator indicating how many OFDM symbols the control information is transmitted through, scheduling information on DL data or UL data, and a HARQ ACK/NACK signal.

In the LTE system, the scheduling information on the DL data or the UL data is transferred from a BS to a terminal through downlink control information (DCI). The DCI is defined in various formats, and may indicate, according to each format, whether the scheduling information is UL data scheduling information (UL grant) or DL data scheduling information (DL grant), whether the DCI is compact DCI having a small size of control information, whether spatial multiplexing using multiple antennas is applied, or whether the DCI is DCI for controlling power. For example, DCI format 1 that is the scheduling control information (DL grant) of the DL data may include at least the following control information:

Resource allocation type 0/1 flag: Indicates whether a resource allocation type is type 0 or type 1. The type 0 allocates resources in units of resource block groups (RBGs) through applying of a bitmap type. In the LTE system, a basic unit of scheduling is RB that is expressed as a time and frequency domain resource, and the RBG is composed of a plurality of RBs to be considered as the basic unit of scheduling in the type 0. The type 1 allocates a specific RB in the RBG.

RB assignment: Indicates RB that is allocated for data transmission. An expressed resource is determined in accordance with a system bandwidth and a resource allocation method.

Modulation and coding scheme (MCS): indicates a modulation method used for data transmission and the size of a TB that is data to be transmitted.

HARQ process number: Indicates a process number of HARQ.

New data indicator: Indicates whether HARQ transmission is initial transmission or retransmission.

Redundancy version: Indicates a redundancy version of HARQ.

Transmit power control (TPC) command for physical uplink control channel (PUCCH): Indicates a transmission power control command for a PUCCH that is a UL control channel.

The DCI may be transmitted through a physical downlink control channel (PDCCH) (or control information, hereinafter, mixedly used) that is a DL physical control channel or an enhanced PDCCH (EPDCCH) (or enhanced control information, hereinafter, mixedly used) after passing through a channel coding and modulation process.

In general, the DCI is scrambled by a specific radio network temporary identifier (RNTI) or terminal identifier independently with respect to each terminal, is added with a cyclic redundancy check (CRC), is channel-coded, and then is configured as an independent PDCCH to be transmitted. In the time domain, the PDCCH is mapped and transmitted for the control channel transmission interval. A mapping location of the PDCCH in the frequency domain is determined by the identifier (ID) of each terminal, and the PDCCH may be transmitted through the transmission band of the whole system.

The DL data may be transmitted through a physical downlink shared channel (PDSCH) that is a physical channel for transmitting the DL data. The PDSCH may be transmitted after the control channel transmission interval, and scheduling information, such as a concrete mapping location or a modulation method in the frequency domain, may be included in the DCI to be transmitted through the PDCCH.

The BS notifies the terminal of a modulation method applied to the PDSCH to be transmitted and a transport block size (TBS) to be transmitted, by using an MCS among the control information constituting the DCI. The MCS may be composed of 5 bits, or may be composed of another number of bits. The TBS corresponds to the size before channel coding for error correction is applied to the TB to be transmitted by the BS.

According to an embodiment a TB may include a MAC header, a MAC CE, at least one MAC service data unit (SDU), and padding bits. Also, a TB may indicate a unit of data or MAC protocol data unit (PDU) transmitted from a MAC layer to a physical layer.

The modulation method supported in the LTE system is quadrature phase shift keying (QPSK), 16 quadrature amplitude modulation (16QAM), or 64QAM, and respective modulation orders ($Q_m$) correspond to 2, 4, and 6. In the case of the QPSK modulation, 2 bits per symbol may be transmitted, in the case of the 16QAM modulation, 4 bits per symbol may be transmitted, and in the case of the 64QAM modulation, 6 bits per symbol may be transmitted. Also, a modulation method of 256QAM or more may be used according to system modification.

Figure 2:
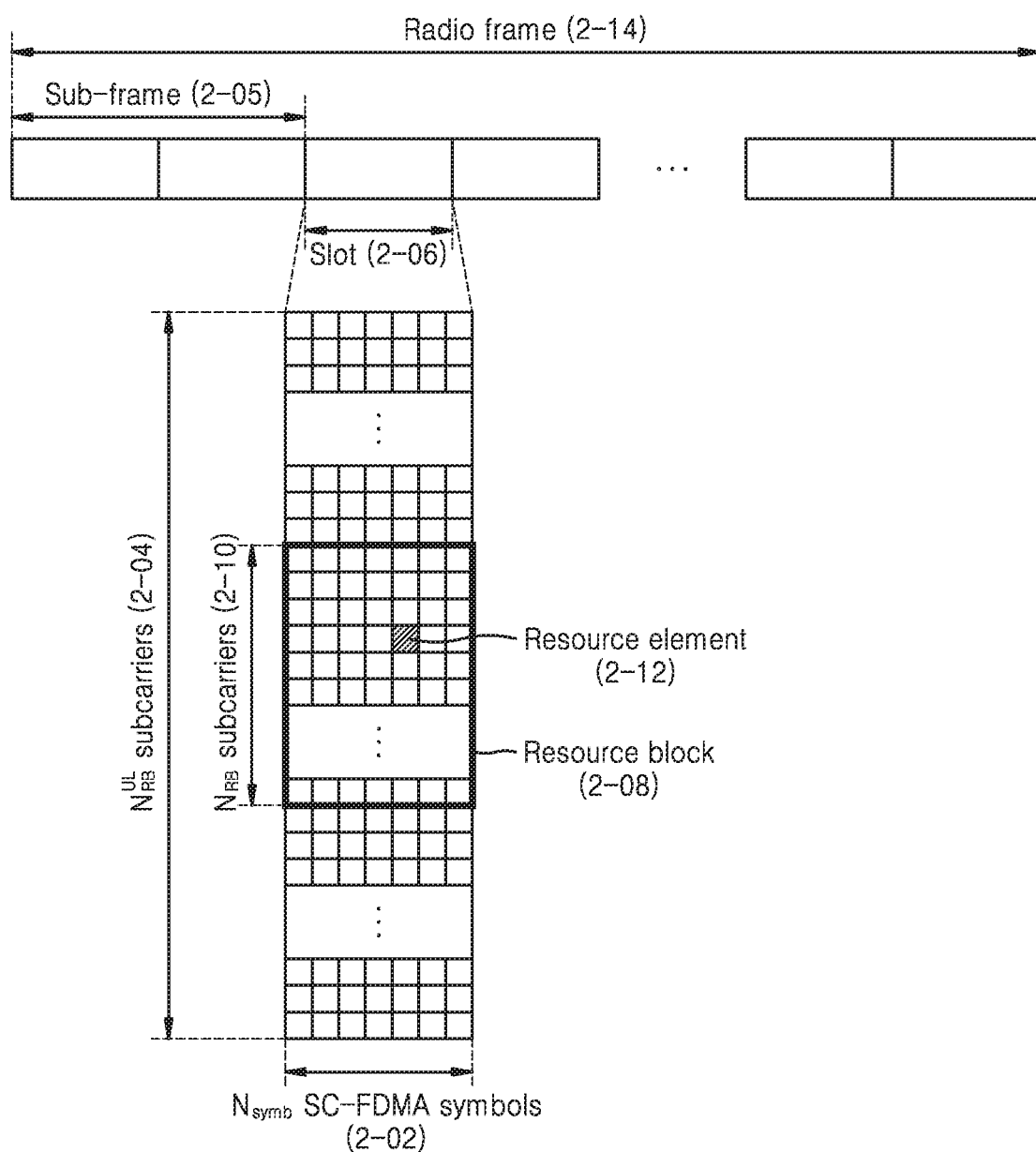
FIG. 2 is a diagram of a transmission structure of a time-frequency domain that is an uplink (UL) wireless resource region of an LTE system, an LTE-A system, or a similar system according to an embodiment of the disclosure.

FIG. 2 is a diagram of a transmission structure of a time-frequency domain that is a UL wireless resource region of a LTE system or a similar system according to an embodiment of the disclosure.

Referring to FIG. 2, a horizontal axis represents a time domain and a vertical axis represents a frequency domain in a wireless resource region. A radio frame 2-14 is a time domain interval. In the time domain, the minimum transmission unit in a time domain is a SC-FDMA symbol 2-02, and $N_{symb}^{UL}$ SC-FDMA symbols are gathered to constitute one slot 2-06. Two slots are gathered to constitute one sub-frame 2-05. The minimum transmission unit in the frequency domain is a subcarrier, and a transmission bandwidth of the whole system is composed of $N_{RB}^{UL}$ subcarriers 2-04 in total. $N_{RB}^{UL}$ may have a value in proportion to a system transmission bandwidth.

In the time-frequency domain, a basic unit of a resource is a RE 2-12, and may be defined as an SC-FDMA symbol index and a subcarrier index. A RB pair 2-08 is defined as $N_{symb}$ successive SC-FDMA symbols in the time domain and NR successive subcarriers 2-10 in the frequency domain. Accordingly, one RB is composed of $N_{symb} \times N_{RB}$ REs. In general, the minimum transmission unit of data or control information is an RB unit. A PUCCH may be mapped on the frequency domain corresponding to 1 RB, and transmitted for one sub-frame.

In the LTE system, the timing relationship between a PDSCH that is a physical channel for transmitting DL data or a PDCCH/EPDCCH including a semi-persistent scheduling (SPS) release and a UL physical channel (PUCCH or PUSCH) through which a corresponding HARQ ACK/NACK is transmitted may be defined. As an example, in the LTE system that operates as a FDD, the HARQ ACK/NACK corresponding to the PDSCH transmitted in the (n−4)-th sub-frame or the PDCCH/EPDCCH including the SPS release is transmitted by the PUCCH or PUSCH in the n-th sub-frame.

In the LTE system, a DL HARQ adapts an asynchronous HARQ method in which data re-transmission time is not fixed. When the HARQ NACK is fed back from the terminal with respect to the initially transmitted data transmitted by the BS, the BS freely determines the transmission time of re-transmitted data through the scheduling operation. The terminal buffers the data that is determined as an error as the result of decoding the received data for the HARQ operation, and then performs combining with the next re-transmitted data.

When PDSCH including DL data transmitted from the BS in a sub-frame n is received, the terminal transmits UL control information including HARQ ACK or NACK of the DL data to the BS through PUCCH or PUSCH in a sub-frame n+k. k may be differently defined in accordance with FDD or time division duplex (TDD) of the LTE system and a sub-frame configuration. As an example, in an FDD LTE system, k is fixed to 4. On the other hand, in a TDD LTE system, k may be changed in accordance with the sub-frame configuration and a sub-frame number. During data transmission through a plurality of carriers, the value of k may be differently applied in accordance with a TDD configuration of each carrier.

In the LTE system, in contrast to DL HARQ, UL HARQ adapts a synchronous HARQ method in which data transmission time is fixed. A UL/DL timing relationship among a physical uplink shared channel (PUSCH) that is a physical channel for transmitting the UL data, a PDCCH that is a preceding DL control channel, and a physical hybrid indicator channel (PHICH) that is a physical channel through which the DL HARQ ACK/NACK corresponding to the PUSCH is transmitted may be fixed by a following rule.

When the PDCCH including UL scheduling control information transmitted from the BS in the sub-frame n or the PHICH through which the DL HARQ ACK/NACK is transmitted is received, the terminal transmits the UL data corresponding to the control information through the PUSCH in the sub-frame n+k. k may be differently defined in accordance with the FDD or TDD of the LTE system and its configuration. As an example, in the FDD LTE system, k is fixed to 4. On the other hand, in the TDD LTE system, k may be changed in accordance with the sub-frame configuration and the sub-frame number.

In the FDD LTE system, when the BS transmits a UL scheduling approval or a DL control signal and data to the terminal in the sub-frame n, the terminal receives the UL scheduling approval or the DL control signal and data in the sub-frame n. First, when the UL scheduling approval is received in the sub-frame n, the terminal transmits the UL data in a sub-frame n+4. When the DL control signal and data are received in the sub-frame n, the terminal transmits HARQ ACK or NACK with respect to the DL data in the sub-frame n+4. Accordingly, a preparation time for the terminal to receive the UL scheduling approval and transmit the UL data or to receive the DL data and transmit the HARQ ACK or NACK is 3 ms corresponding to three sub-frames. Also, when the terminal receives the PHICH that carries the DL HARQ ACK/NACK from the BS in a sub-frame i, the PHICH corresponds to the PUSCH transmitted by the terminal in a sub-frame i-k. k is differently defined in accordance with the FDD or TDD of the LTE system and its configuration. As an example, in the FDD LTE system, k is fixed to 4. On the other hand, in the TDD LTE system, k may be changed in accordance with the sub-frame configuration and the sub-frame number. During data transmission through a plurality of carriers, the k value may be differently applied in accordance with the TDD configuration of each carrier.

A wireless communication system has been described above with reference to an LTE system, but an embodiment is not applied only to the LTE system, but may also be applied to various wireless communication systems, such as NR and 5G systems. When an embodiment is applied to another wireless communication system, the value of k may be changed even in a system using a modulation method corresponding to FDD.

In a 5G or NR access technology system that is a new communication system, various services are designed to be freely multiplexed in time and frequency resources, and accordingly, waveforms, numerology, reference signals, etc. may be dynamically or freely assigned as required by a corresponding service. In order to provide an optimal service to a terminal in wireless communication, data transmission optimized via the quality of a channel and measurement of interference is important, and thus, it is essential to accurately measure a channel state. However, unlike 4G communication in which channel and interference characteristics are not largely changed according to frequency resources, channel and interference characteristics may be largely changed according to a service in a 5G or NR system, and thus support of a subset in terms of a frequency resource group (FRG) is required such that the channel and interference characteristics are divided and measured. Meanwhile, types of services supported in the 5G or NR system may be divided into categories of eMBB, mMTC, and URLLC. Here, eMBB may be a service targeting high speed transmission of high capacity data, mMTC may be a service targeting terminal power consumption minimization and access of a plurality of terminals, and URLLC may be a service targeting high reliability and low latency. Different requirements may be applied based on a type of service applied to a terminal.

As such, a plurality of services may be provided to a user in a communication system, and methods and apparatuses for providing the plurality of services in the same time section are required so as to provide the plurality of services to the user.

Figure 3:
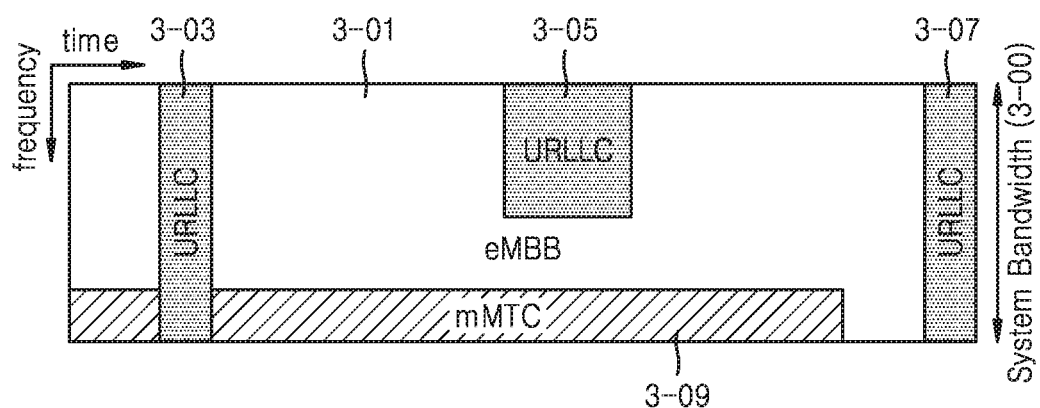
FIGS. 3 and 4 are diagrams for describing a method of assigning enhanced mobile broadband (eMBB), ultra-reliable and low-latency communications (URLLC), and massive machine-type communications (mMTC), which are services considered in a $5^{th}$ generation (5G) or new radio (NR) system, in time-frequency resources according to various embodiments of the disclosure.
Figure 4:
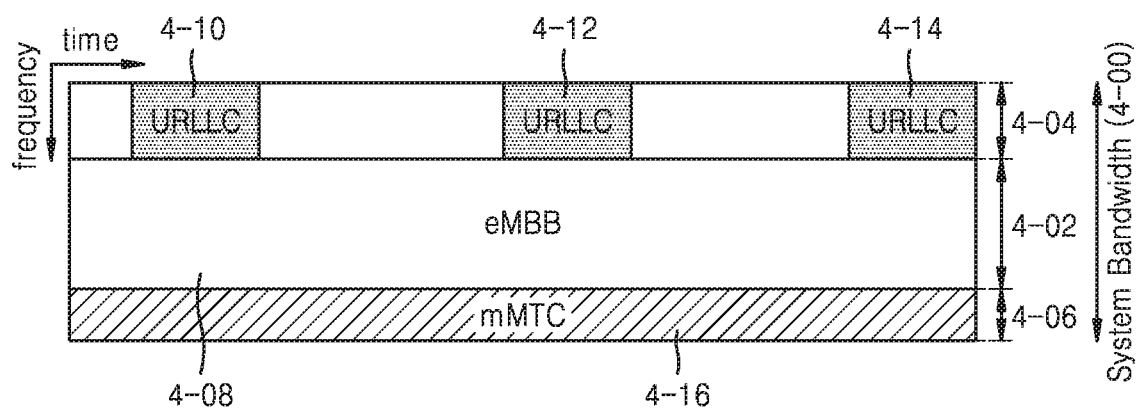

FIGS. 3 and 4 are diagrams for describing a method of assigning eMBB, URLLC, and mMTC, which are services considered in a 5G or NR system, in time-frequency resources according to various embodiments of the disclosure.

FIGS. 3 and 4 illustrate how frequency and time resources are assigned for information transmission in each system.

Referring to FIG. 3, eMBB data 3-01, URLLC data 3-03 through 3-07, and mMTC data 3-09 may be assigned in an entire system frequency bandwidth 3-00. In a 5G or NR system, when the URLLC data 3-03 through 3-07 are generated and need to be transmitted while the eMBB data 3-01 and the mMTC data 3-09 are assigned to a certain frequency band and transmitted, regions to which the eMBB data 3-01 and the mMTC data 3-09 are already assigned may be emptied or transmission of the eMBB data 3-01 and the mMTC data 3-09 may be stopped at the regions and the URLLC data 3-03 through 3-07 may be transmitted. For example, since the URLLC data 3-03 through 3-07 corresponds to a service that requires reduction of a delay time, the URLLC data 3-03 through 3-07 may be transmitted by being assigned to some of resources to which the eMBB data 3-01 is assigned. When the URLLC data 3-03 through 3-07 are transmitted by being additionally assigned to the resources to which the eMBB data 3-01 is assigned, the eMBB data 3-01 may not be transmitted in overlapping time-frequency resources, and accordingly, transmission performance of the eMBB data 3-01 may be decreased. In other words, at this time, a transmission failure of the eMBB data 3-01 may occur due to assignment of the URLLC data 3-03 through 3-07.

Referring to FIG. 4, in the 5G or NR system, each of sub-bands 4-02 through 4-06 divided from an entire system frequency bandwidth 4-00 may be used to transmit a service and data. Information related to setting of a sub-band may be pre-determined, and such information may be transmitted from a BS to a terminal via higher signaling, according to an embodiment. According to another embodiment, the BS or a network node may arbitrarily divide the information and provide services without transmitting the information to the terminal). In FIG. 4, the first sub-band 4-02 is used to transmit eMBB data 4-08, the second sub-band 4-04 is used to transmit URLLC data 4-10 through 4-14, and the third sub-band 4-06 is used to transmit mMTC data 4-16.

In the current embodiment, a length of TTI taken to transmit the URLLC data 4-10 through 4-14 may be shorter than a length of TTI taken to transmit the eMBB data 4-08 or the mMTC data 4-16. Also, a response to information related to the URLLC data 4-10 through 4-14 may be transmitted faster than in the case of the eMBB data 4-08 or the mMTC data 4-16, and accordingly, information may be transmitted or received with low latency.

According to an embodiment, a structure of a physical layer channel used to transmit the above three types of data may vary. For example, at least one of a length of TTI, an assigning unit of frequency resources, a structure of a control channel, and a data mapping method may vary.

Three types of data have been described in FIGS. 3 and 4, but there may be more types of services and data corresponding to the services, and the disclosure may also be applied thereto.

Figure 5:
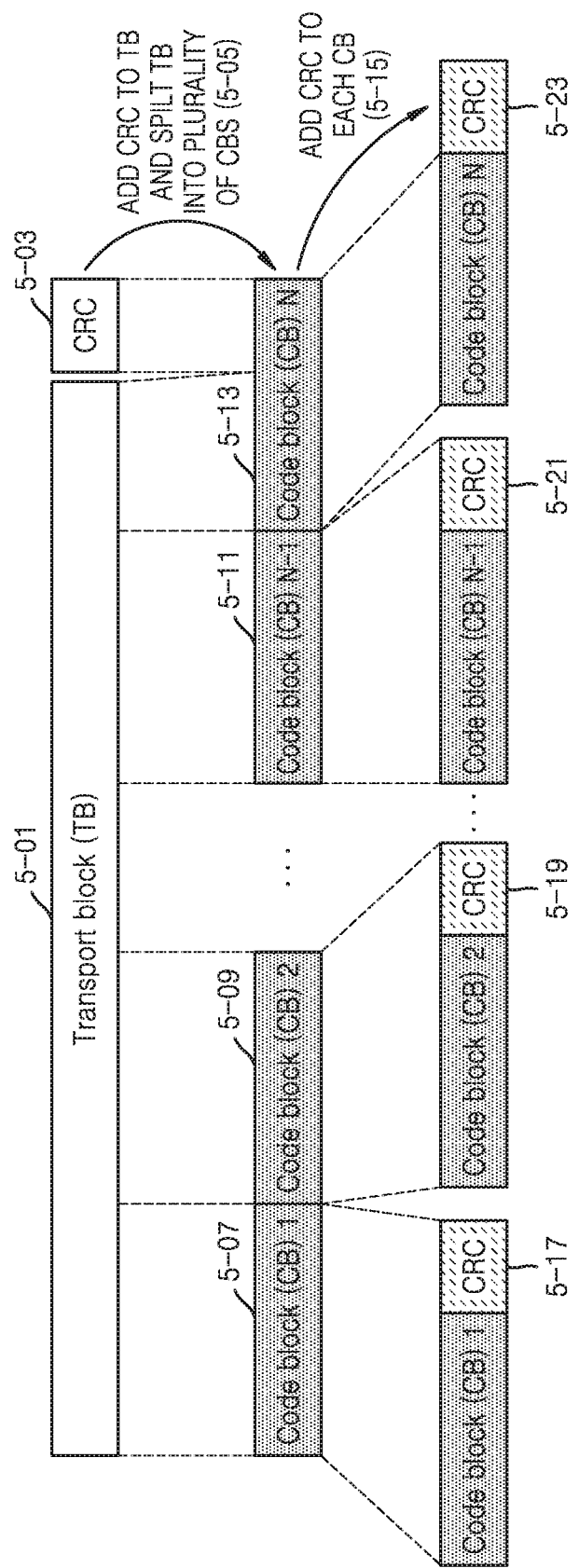
FIG. 5 is a diagram of a structure in which one transport block is divided into a plurality of code blocks and a cycle redundancy check (CRC) is added, according to an embodiment of the disclosure.

FIG. 5 is a diagram of a structure in which one transport block (TB) 5-01 is divided into a plurality of code blocks (CBs) 5-07 through 5-13 and a cycle redundancy check (CRC) 5-03 is added, according to an embodiment of the disclosure.

Referring to FIG. 5, the CRC 5-03 may be added at the front or back of one TB 5-01 to be transmitted in UL or DL. The CRC 5-03 may have 16 bits, 24 bits, or a pre-fixed bit number, or may have a bit number varied according to a channel state, and may be used to determine whether channel coding is successful. The TB 5-01 to which the CRC 5-03 is added may be divided into the plurality of CBs 5-07 through 5-13 in operation 5-05. Largest sizes of such CBs 5-07 through 5-13 may be pre-determined, and in this case, the last CB 5-13 may have a size smaller than the other CBs 5-07 through 5-11 or may be adjusted to have the same length as the other CBs 5-07 through 5-11 by having 0, a random value, or 1 inserted into the last CB 5-13. CRCs 5-17 through 5-23 may be respectively added to the CBs 5-07 through 5-13 in operation 5-15. Each of the CRCs 5-17 through 5-23 may have 16 bits, 24 bits, or a pre-fixed number of bits, and may be used to determine the success of channel coding. However, the CRC 5-03 added to the TB 5-01 and the CRCs 5-17 through 5-23 added to the CBs 5-07 through 5-13 may be omitted according to a type of a channel code to be applied to a CB. For example, when a low density parity check code (LDPCC) is applied to a CB instead of a turbo code, the CRCs 5-17 through 5-23 to be added respectively to the CBs 5-07 through 5-13 may be omitted. However, the CRCs 5-17 through 5-23 may be added to the CBs 5-07 through 5-13 even when the LDPCC is applied. Also, the CRCs 5-17 through 5-23 may be added or omitted even when a polar code is used.

As shown in FIG. 5, in a TB to be transmitted, a maximum length of a CB is determined based on a type of channel coding, and a TB and CRC added to the TB are divided into CBs according to the maximum length of the CB. In an LTE system, a CRC for a CB is added to a CB, coded bits are determined as a data bit generated by encoding the CB and CRC via a channel code, and following processes are performed on each of the coded bits to determine a rate-matching bit number. In other words, a parity to be transmitted is determined.

[Start Rate-Matching Bit Number Determination or Transmission Bits Collection]

Operation 1: Denoting by E the rate matching output sequence length for the r-th coded block, and by $rv_{idx}$ the redundancy version number for this transmission ($rv_{idx}=0$, 1, 2 or 3), the rate matching output bit sequence being $e_k$, $k=0, 1, \ldots, E-1$.

Operation 2: Define by G the total number of bits available for the transmission of one transport block.

Operation 3: Set $G'=G/(N_L \cdot Q_m)$ where $Q_m$ is equal to 2 for QPSK, 4 for 16QAM, 6 for 64QAM and 8 for 256QAM, and where, for transmission diversity: $N_L$ is equal to 2; otherwise: $N_L$ is equal to the number of layers a transport block is mapped onto.

Operation 4: Set $\gamma=G'$ mod C, where C is the number of code blocks of a TB

--- if r ≤ C−r−1
   set $E = N_L \cdot Q_m \cdot \lfloor G'/C \rfloor$
else
   set $E = N_L \cdot Q_m \cdot \lceil G'/C \rceil$
end if

---

Operation 5: Set $$k_0 = R_{subblock}^{TC} \cdot \left(2 \cdot \left\lceil \frac{N_{cb}}{8R_{subblock}^{TC}} \right\rceil \cdot rv_{idx} + 2 \right),$$

where $R_{subblock}^{TC}$ is the number of rows of block interleaver,

--- k = 0 and j = 0
while { k < E }
   if $w(k_0 + j)$ mod $N_{cb}$ ≠< NULL >
     $e_k = W(k_0 + j)$ mod $N_{cb}$
     k = k + 1
   end if
   j = j + 1
end while

---

[End Rate-Matching Bit Number Determination or Transmission Bits Collection]

The operations above may be summarized as follows.

Operation 1: E is defined such that a length of a rate-matching result of an r-th CB is indicated.

Operation 2: G indicates information bits mappable for transmitting a TB. For example, G may be calculated according to the number of REs to which TB is mapped*modulation order*a layer number.

Operation 3: G' is a value obtained by dividing G by the layer number and the modulation order.

Operation 4: Considering G', a mappable information bit amount E as close as possible to all CBs is calculated, and lengths of rate-matching results of transmitted CBs are similar per CB.

Operation 5: Mapping information bits are configured such that coded bits of a CB are mapped only by the value E of the length of a rate-matching result of a CB calculated in operation 4. When the bit number E of the rate-matching result mappable per CB is determined, the transmittable resource amount G' is divided by the number of CBs included in the TB.

Figure 6:
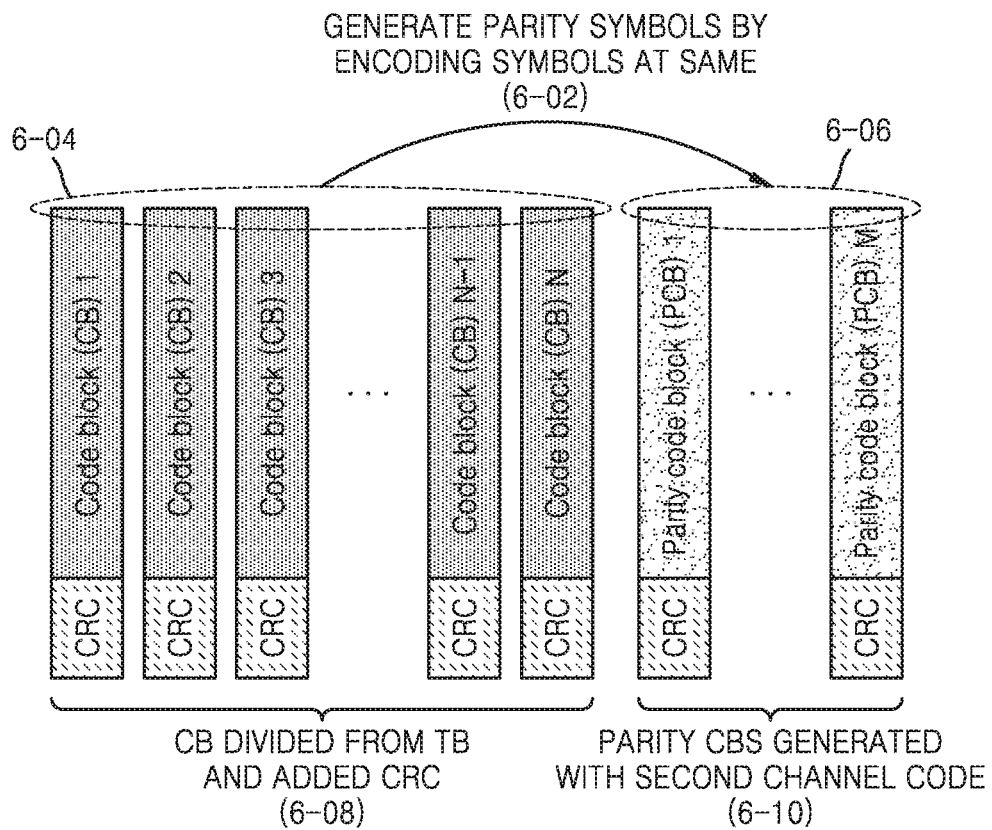
FIG. 6 illustrates a transmission method using an outer code, according to an embodiment of the disclosure.

FIG. 6 is a diagram of a structure coded after an outer code is applied, according to an embodiment of the disclosure.

Figure 7A:
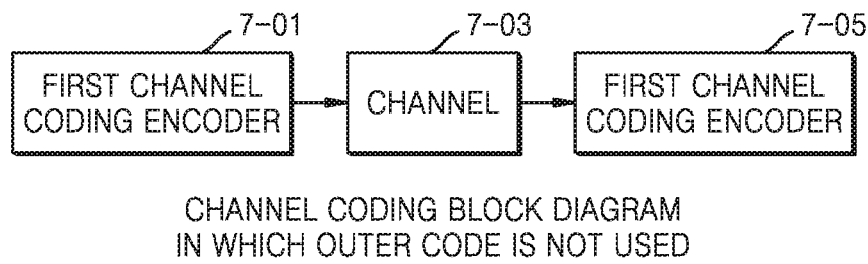
FIGS. 7A and 7B are diagrams for describing operation processes based on whether an outer code is applied, according to various embodiments of the disclosure.
Figure 7B:
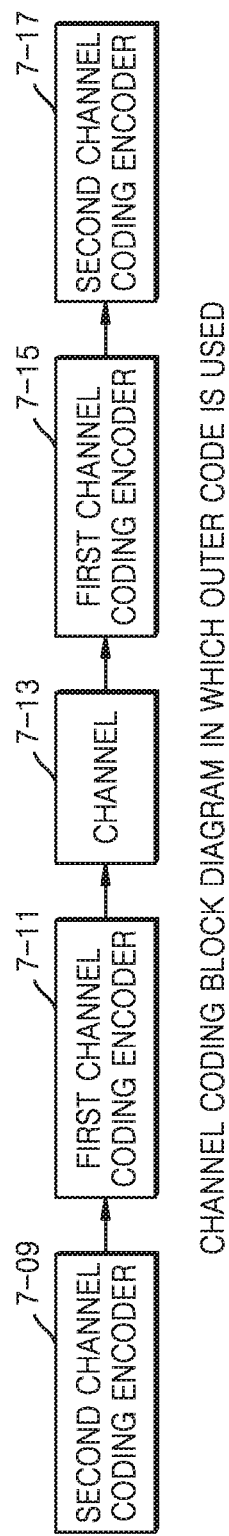

FIGS. 7A and 7B are diagrams for describing operation processes based on whether an outer code is applied, according to various embodiments of the disclosure.

Referring to FIGS. 6, 7A and 7B, a method of transmitting a signal by using an outer code will be described.

Referring to FIG. 6, a TB is divided into several CBs, and bits or symbols 6-04 that are at the same location in the respective CBs may be encoded with a second channel code to generate parity bits or symbols 6-06 (6-02). Thereafter, CRCs may be added to the respective CBs and parity CBs generated through second channel code encoding (6-08 and 6-10). The addition of the CRCs may differ depending on a type of a channel code. For example, when a turbo code is used as a first channel code, the CRCs are added in operations 6-08 and 6-10, but thereafter, the respective CBs and parity CBs may be encoded through first channel code encoding. Here, a TB may be one TB transferred from an upper layer to a physical layer. In the physical layer, the TB is considered as data. First, the CRC is added to the TB. In order to generate the CRC, TB data bits and a cyclic generator polynomial may be used, and the cyclic generator polynomial may be defined by various methods. For example, when the cyclic generator polynomial for a 24-bit CRC is $g_{CRC24A}(D)=D^{24}+D^{23}+D^{18}+D^{17}+D^{14}+D^{11}+D^{10}+D^7+D^6+D^5+D^4+D^3+D+1$ and L is L=24, the CRC $p_0, p_1, p_2, p_3, \ldots, p_{L-1}$ is determined as a value obtained by dividing $a_0D^{A+23}+a_1D^{A+22}+ \quad . \quad . \quad . \quad +a_{A-1}D^{24}+p_0D^{23}+p_1D^{22}+ \ldots +p_{22}D^1+p_{23}'$, by $g_{CRC24A}(D)$ with the remainder of 0 with respect to TB data $a_0, a_1, a_2, a_3, \ldots, a_{A-1}$|. In the above-described example, although the CRC length L=24, various lengths, such as, 12, 16, 32, 40, 48, and 64 may be used. The CRCs are added to the divided CBs, and a cyclic generator polynomial that is different from that of the CRC of the TB may be used as the CRC of the CB.

In an LTE system, during retransmission due to an initial transmission failure, the initially transmitted TB is retransmitted. According to an embodiment, retransmission in a unit of a CB or several CBs, rather than in the unit of a TB, may become possible, unlike in the LTE system. For this, a terminal may transmit multi-bit HARQ-ACK feedback per TB. Further, during the retransmission, information may be provided as control information for scheduling transmitted from the BS, indicating what portion of the TB is being retransmitted.

When an outer code is used, data to be transmitted passes through a second channel coding encoder 7-09. As a channel code used for second channel coding, e.g., a Reed-Solomon code, a broadcast channel (BCH) code, a raptor code, or a parity bit generation code may be used. Bits or symbols that have passed through the second channel coding encoder 7-09 pass through a first channel coding encoder 7-11. A channel code used for first channel coding may be a convolutional code, an LDPC code, a turbo code, or a polar code.

When the channel coded symbols are received in a receiver, after passing through a channel 7-13, the receiver may successively operate a first channel coding decoder 7-15 and a second channel coding decoder 7-17 based on the received signal. The first channel coding decoder 7-15 and the second channel coding decoder 7-17 may perform operations corresponding to the operations of the first channel coding encoder 7-11 and the second channel coding encoder 7-09.

However, when the outer code is not used, although the first channel coding encoder 7-11 and a first channel coding decoder 7-05 are used in the transceiver, a second channel coding encoder and a second channel coding decoder are not used. Even when the outer code is not used, the first channel coding encoder 7-11 and the first channel coding decoder 7-05 may be configured in the same manner as when the outer code is used. FIG. 7A illustrates a block diagram in which the outer code is not used, showing a first channel encoder 7-01, a channel 7-03, and the first channel coding encoder 7-05.

Herein, an eMBB service is referred to as a first type service, and data for eMBB is referred to as first type data. The first type service or the first type data is not limited to the eMBB, but may correspond to a scenario in which high-speed data transmission is required or broadband transmission is performed. Further, a URLLC service is referred to as a second type service, and data for URLLC is referred to as second type data. The second type service or the second type data is not limited to the URLLC, but may correspond to a scenario in which low latency is required or ultra-reliable transmission is necessary, or may correspond to another system in which both low-latency and ultra-reliability are required. Further, an mMTC service is referred to as a third type service, and data for mMTC is referred to as third type data. The third type service or the third type data is not limited to the mMTC, but may correspond to a scenario in which a low speed, a wide coverage, or a low power is required. Further, the first type service may or may not include the third type service.

In order to transmit three types of services or data as described above, different physical layer channel structures may be used for the respective types. For example, at least one of a TTI length, a frequency resource allocation unit, a control channel structure, and a data mapping method may differ.

Although three types of services and three types of data have been described, more types of services and corresponding data may exist, and the disclosure may be applied thereto.

As described above, an embodiment of the disclosure proposes a method for defining transmission/reception operations of a terminal and a BS for transmitting first to third type services or data, and for operating terminals that receive different types of services or data scheduling together in the same system. The first to third type terminals receive the first to third type services or data scheduling. The first to third type terminals may be the same terminals or different terminals.

Figure 8A:
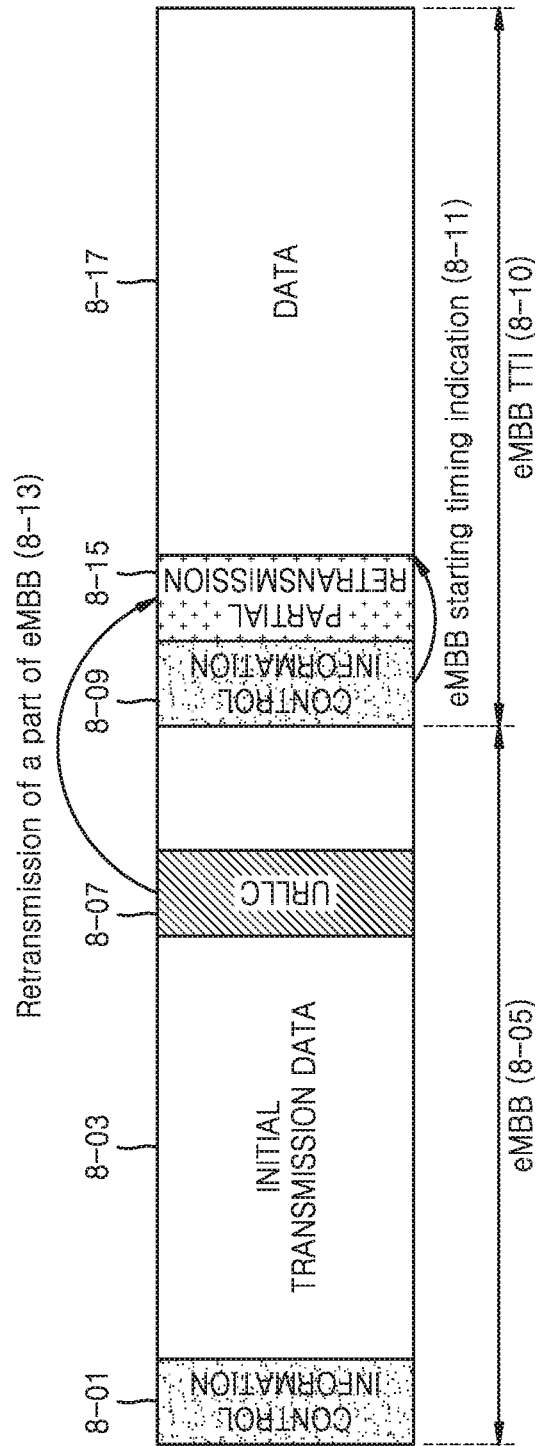
FIGS. 8A, 8B, and 8C are diagrams of examples of partial retransmission according to various embodiments of the disclosure.
Figure 8B:
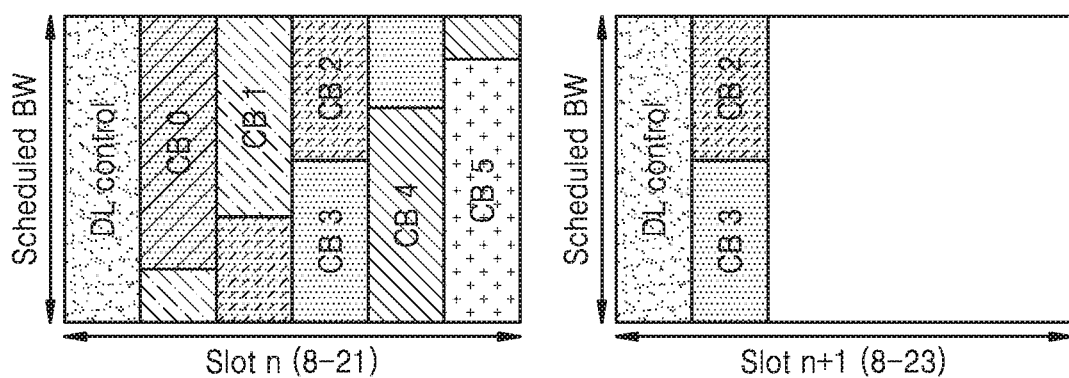
Figure 8C:
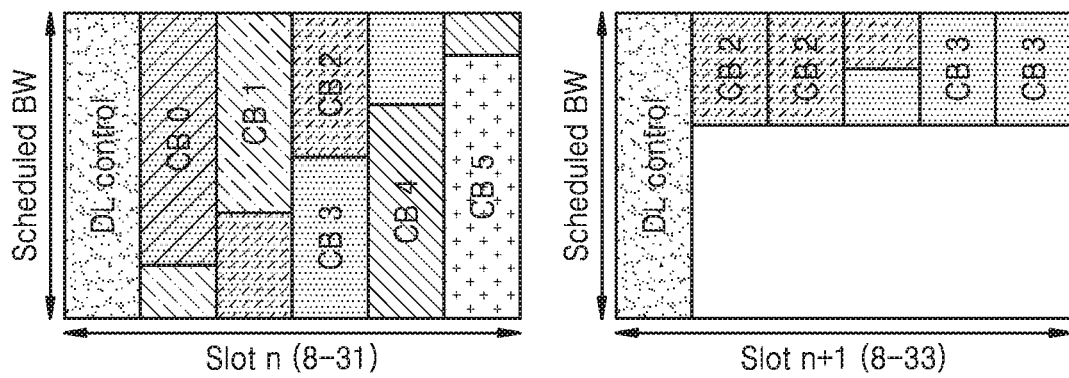

FIGS. 8A, 8B, and 8C are diagrams of examples of partial retransmission, according to various embodiments of the disclosure.

Referring to FIG. 8A, a BS schedules eMBB data 8-03 to a terminal a by using a control signal 8-01. Thereafter, when the eMBB data 8-03 is transmitted, a part 8-07 of a resource onto which the eMBB data is to be mapped is used to transmit other data 8-07 to the terminal a or another terminal b. Thereafter, a part 8-15 of the eMBB data that has been transmitted or has not been transmitted to the terminal a is retransmitted to a next TTI 8-10. The unit of the partial retransmission may be a CB or a CB group including one or more CBs. The eMBB control signal 8-01 transfers scheduling information for the eMBB data 8-03 to the terminal a. When URLLC data is generated during transmission of the eMBB data 8-03, the BS transmits a URLLC control signal and data to terminal b (8-07). The transmission of the URLLC control signal and data is performed through mapping of the URLLC control signal and the data 8-07 onto a resource to be transmitted, without mapping a part of the existing scheduled eMBB data 8-03 onto the resource. Accordingly, a part of the eMBB is not transmitted from the existing TTI 8-05. As a result, the eMBB terminal may fail to decode the eMBB data. To supplement this, a part of the eMBB data that is not transmitted at the TTI 8-05 is transmitted at the TTI 8-10 (8-13). The partial transmission is performed at the TTI 8-10 after the initial transmission, and may be performed without receiving HARQ-ACK information for the initial transmission from the terminal. Through the partial transmission, scheduling information may be transferred from a control signal region 8-09 of the next TTI. The control signal region 8-09 of the next TTI may include information on a symbol location at which the resource mapping of the eMBB data or other data 8-17 starts when the eMBB data or other data 8-17 is transmitted to another terminal (8-11). The information may be transferred from partial bits of DCI transmitted from the control signal region 8-09. Using the information on the symbol location at which resource mapping of the eMBB data or other data 8-17 starts, a specific symbol performs partial transmission 8-15 for the previous initial transmission. The eMBB control signal 8-01 or 8-09 of FIG. 8A may not be transferred from the entire indicated region, but may be transferred only from the partial region. Further, it is also possible to transfer the eMBB control signal 8-01 or 8-09 from a partial frequency band other than the entire frequency band.

Although the partial retransmission 8-15 is performed at the next TTI since a part of the eMBB is not transmitted for transmission of the URLLC data 8-07, the partial retransmission may be used in a manner that the BS optionally retransmits a specific part of data although it is not caused by the URLLC data transmission. According to an embodiment, the partial retransmission 8-15 may be discriminated as the initial transmission of the corresponding part. That is, the terminal that has received the partial retransmission 8-15 at the next TTI 8-10 does not perform HARQ decoding through combination with the received part at the previous TTI 8-05, but may perform separate decoding using only the partial retransmission 8-15 at the next TTI 8-10.

Further, although the retransmission is performed from a first symbol after the control signal at the TTI 8-10 after the initial transmission, the location of the retransmission may be variously changed to be applied, according to an embodiment. Although DL transmission has been described in FIG. 8A as an example, the retransmission is also applicable to UL transmission.

As shown in FIGS. 8B and 8C, CB2 and CB3 among 6 initially transmitted CBs are retransmitted. As such, only a partial CB of an initially transmitted TB or a CB-group (CBG) may be retransmitted in an NR system.

In the disclosure, a retransmission method of a CBG unit is described. In the disclosure, CBG unit retransmission, partial retransmission, and CBG retransmission may be interchangeably used.

As described above, when data is transmitted in a wireless communication system, in particular, an LTE system, transmission is performed in units of TBs. A TB may be divided into a plurality of CBs, and channel coding is performed in units of CBs. Retransmission is performed after initial transmission in units of TBs, and the entire TB need to be retransmitted even when decoding of just one CB fails. Thus, there may be a case in which retransmission in units of CBs is required, and for this, a CB index for notifying an order of CBs may be inserted into a CB to be operated. According to an embodiment, a 5G or NR system may provide a method and apparatus for performing retransmission in units of CBGs.

According to an embodiment, a TB may include a MAC header, a MAC CE, one or more MAC SDUs, and padding bits. Further, the TB may indicate a unit of data downloaded from a MAC layer to a physical layer, or a MAC PDU.

According to an embodiment, after a CB included in a TB is channel-coded for data transmission, resources where coded bits are mapped are determined. Here, the amount of resources where the CB is mapped may be determined such that amounts of resources used for CBs are the same as much as possible. When retransmission is performed in units of TBs like an LTE system, the number of transmitted CBs is determined according to the CB included in the TB. However, when CBG retransmission is performed, the number of transmitted CBs is determined via BS scheduling. Accordingly, a method of determining a region of resources where coded bits of a CB based on a transmitted CB is required, and according to an embodiment, a method and apparatus for determining a region of resources according to the number of actually transmitted CBs may be provided.

When N_{CBG,max} denotes a CBG number or a maximum CBG number set by a BS with respect to a terminal, N_{CBG,max} and $N_{CBG,max}$ may be interchangeably used. Also, when the number of CBs included in a scheduled TB is C, an actual CBG number M when a TB is scheduled may be determined to be M=min($N_{CBG,max}$, C), and min(x, y) may denote a smaller value among x and y. C CBs included in a TB are grouped based on a following rule to form M CBGs.

First mod(C, M) CBGs each include ceil(C/M) or ⌈C/M⌉ CBs.

List M-mod(C,M) CBGs each include floor(C/M) or ⌊C/M⌋ CBs.

Here, ceil(C/M) or ⌈C/M⌉ denotes a minimum integer not lower than C/M, and floor(C/M) or ⌊C/M⌋ denotes a maximum integer that is not higher than C/M. For example, when C/M is 4.3, ceil(C/M) is 5 and floor(C/M) is 4. According to such a rule, CBs are grouped sequentially from the front CBG.

As described above, when a maximum CBG number set with respect to a terminal is $N_{CBG,max}$, DCI transmitted to schedule CBG unit retransmission may be set to include $N_{CBG,max}$ bits for CBG transmission information (CBGTI). The CBGTI may be an indicator indicating which CBGs are transmitted in current scheduling. For example, when the BS set $N_{CBG,max}$=4 with respect to the terminal, one TB may include maximum 4 CBGs, DCI may include 4 bits to indicate CBGTI, and each bit may indicate information about whether each CBG is transmitted. For example, when DCI includes bits of 1111 and there are four CBGs, each bit is 1 and thus all CBG may be transmitted. As another example, when DCI includes bits of 1100 and there are four CBGs, only first and second CBGs may be transmitted.

According to an embodiment, a method by which a terminal analyzes CBGTI is provided. In particular, a method of analyzing CBGTI when the number of CBs included in a TB is lower than a set maximum CBG number is provided.

N_{CBG,max} denotes a CBG number or a maximum CBG number set by a BS with respect to a terminal. N_{CBG,max} and $N_{CBG,max}$ may be interchangeably used. Also, C denotes a number of CBs included in a scheduled TB. An actual CBG number M when a TB is scheduled may be determined to be M=min($N_{CBG,max}$, C), and min(x, y) may denote a smaller value among x and y. C CBs included in a TB are grouped based on a following rule to form M CBGs.

First mod(C, M) CBGs each include ceil(C/M) or ⌈C/M⌉ CBs.

List M-mod(C,M) CBGs each include floor(C/M) or ⌊C/M⌋ CBs.

Here, ceil(C/M) or ⌈C/M⌉ denotes a minimum integer not lower than C/M, and floor(C/M) or ⌊C/M⌋ denotes a maximum integer that is not higher than C/M. For example, when C/M is 4.3, ceil(C/M) is 5 and floor(C/M) is 4. According to such a rule, CBs are grouped sequentially from the front CBG.

As described above, when a maximum CBG number set to a terminal is $N_{CBG,max}$, DCI transmitted to schedule CBG unit retransmission may be set to include $N_{CBG,max}$ bits for CBG transmission information (CBGTI). The CBGTI may be an indicator indicating which CBGs are transmitted in current scheduling. For example, when the BS set $N_{CBG,max}$=4 with respect to the terminal, one TB may include maximum 4 CBGs, DCI may include 4 bits to indicate CBGTI, and each bit may indicate information about whether each CBG is transmitted. For example, when DCI includes bits of 1111 and there are four CBGs, each bit is 1 and thus all CBG may be transmitted. As another example, when DCI includes bits of 1100 and there are four CBGs, only first and second CBGs may be transmitted.

When the number C of CBs included in the TB is smaller than $N_{CBG,max}$ and thus the actual CBG number is equal to C, C bits from the front or the back of the CBGTI may be valid bits, and in this case, the terminal ignores the other bits of the CBGTI.

According to another embodiment, a method and apparatus for calculating a length of coded bits of each CB, which is rate-matched, when transmission is performed, are provided.

Figure 9:
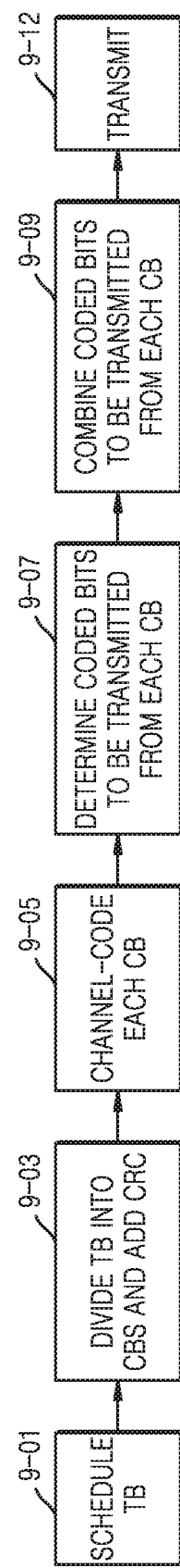
FIG. 9 is a block diagram for describing operations related to channel coding performed until a transport block to be transmitted is actually transmitted, according to an embodiment of the disclosure.

FIG. 9 is a block diagram for describing operations related to channel coding performed until a TB to be transmitted is actually transmitted, according to an embodiment of the disclosure.

Referring to FIG. 9, when a TB to be transmitted is scheduled (9-01), a transport block size (TBS) of data to be transmitted is determined. Thereafter, a CRC is added to the TB, the TB is divided into CBs according to the TBS, and a CRC of a CB may be added (9-03). Channel code encoding is performed on each CB (9-05), and coded bits to be transmitted are determined (9-07). For example, the amount of coded bits to be transmitted is determined. Operation 9-07 may be referred to as rate-matching. Then, the coded bits to be transmitted from each CB are sequentially combined (9-09), and the combined bits are mapped to a physical channel and transmitted (9-12). According to an embodiment, in operation 9-07, a method of determining an amount of coded bits transmitted from each CB considering a number of actually transmitted CBs and an information bit amount transmittable in physical resources is provided.

[Start Rate-Matching Bit Number Determination or Transmission Bits Collection]

Operation 1: Er is defined such that a length of a rate-matching result of an r-th CB is indicated. Here, r= 0, 1, . . . , C−1.

Operation 2: G indicates information bits mappable for transmitting a TB. For example, G may be calculated according to the number of REs to which TB is mapped*modulation order*a layer number. (G: total number of bits available for the transmission of one transport block)

Operation 3: $N_L$ is defined as the number of layers a TB is mapped onto and Q may denote the number of coded bits per QAM symbol. G' is a value obtained by dividing G by $N_L$ and Q, that is, $G'=G/(N_L \cdot Q)$ Operation 4: When scheduling DCI includes CBGTI, C' denotes a number of CBs indicated by the CBGTI and when scheduling DCI does not include CBGTI, C' denotes a number of CBs included in the scheduled TB. By using the value obtained by dividing G' by C', Er that is an amount of resources where the coded bits of transmitted CBs are rate-matched is calculated. Here, Er denotes a length of coded bits of an r-th CB, which is rate-matched. Here, it is to be noted that C' may not be the number of CBs included in the scheduled TB. When only partial CBG is transmitted, C' may be smaller than the number of CBs included in the TB.

Operation 5: Mapping information bits are configured such that coded bits of CB are mapped only by the value Er of the length of the rate-matching result of CB, calculated in operation 4.

[End Rate-Matching Bit Number Determination or Transmission Bits Collection]

In the above operations, operation 4 may be applied according to pseudo-code 1 below.

---

[Start pseudo-code 1]

- Operation 1-1: Set $^\mathsf{Y}$ = mod(G',C'). C denotes a number of CBs scheduled and transmitted, which is determined from a CBGTI field and CB number information included in a TB, when the CBGTI field exists in scheduling DCI, and denotes a number of CBs inlcuded in the TB when the CBGTI field does not exist in the scheduling DCI.
- Operation 1-2:
- set j=0.
While(r<C) or while(r≤C−1)
{if r-th CB is not scheduled (conditional statement 1-2-1)
   set Er = 0
if r-th CB is scheduled (conditional statement 1-2-2),
   if j ≤ C' − $^\mathsf{Y}$ − 1 (conditional statement 1-2-3), execute $E_r = N_L \cdot Q_m \cdot \lceil G'/C' \rceil$ and j=j+1.
   if j > C' − $^\mathsf{Y}$ − 1 (conditional statement 1-2-4),
   execute $E_r = N_L \cdot Q_m \cdot \lfloor G'/C' \rfloor$
   and j=j+1.
}
[End pseudo-code 1]

---

Figure 10:
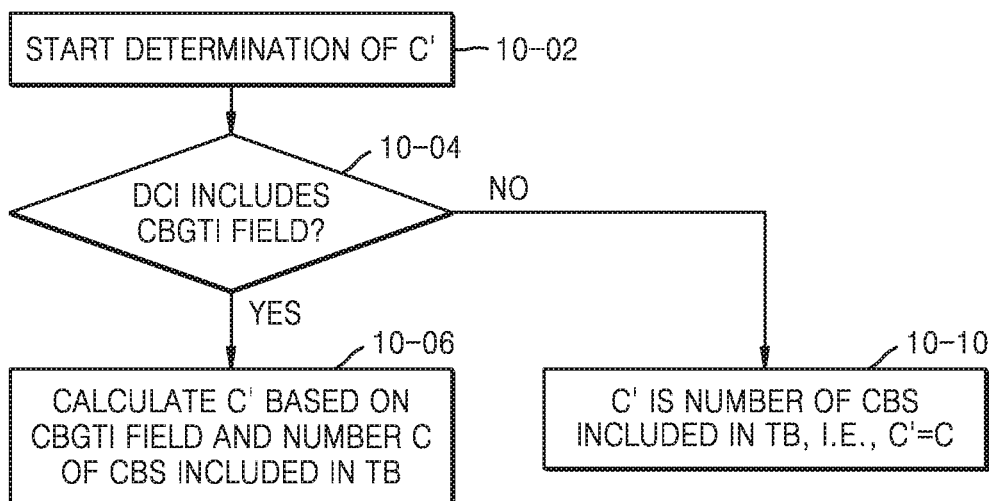
FIG. 10 is a flowchart of a method of determining a rate matching parameter, according to an embodiment of the disclosure.

FIG. 10 is a flowchart of a method of determining a rate matching parameter, according to an embodiment of the disclosure.

In operation 1-1, C' may be calculated according to the flowchart of FIG. 10. When a process of determining C' is started (10-02), whether the CBGTI field is included in the DCI is determined (10-04). C' is calculated based on a CBGTI field and a number C of CBs included in a TB (10-06) when DCI scheduling the TB includes the CBGTI field. When the scheduling DCI does not include the CBGTI field, C' is set to the number of CBs included in the TB, i.e., C'=C (10-10). Here, when the CBGTI field is not included in the scheduling DCI, CBG unit retransmission may not be set or a DCI format for a fall-back mode operation is used despite the CBG unit retransmission being set. Alternatively, when the CBG unit retransmission is set and the CBGTI field is included in the DCI, but a terminal is defined to ignore the CBGTI field to perform an operation defined in a fall-back mode, a method of setting C' to C may be applied.

As an example of operation 10-06, C' may be calculated according to Equation 1 below.

$$C' = \sum_{i=0}^{mod(C,M)-1} c_i \cdot \lceil C/M \rceil + \sum_{mod(C,M)}^{M-1} c_i \cdot \lfloor C/M \rfloor \qquad \text{Equation 1}$$

In Equation 1, $N_{CBG,max}$ denotes a maximum CBG number per TB set from a BS, C denotes a number of CBs included in a TB, and M calculated from M=min($N_{CBG,max}$, C) denotes a CBG number actually included in a TB. When the number of CBs included in the TB is higher than a set maximum CBG number, the TB includes the number of CBGs equal to the set maximum CBG number, and when the number of CBs included in the TB is smaller than or equal to the set maximum CBG number, the TB includes the number of CBGs equal to the number of CBs and in this case, one CB is included in the CBG. Here, may denote an i-th bit value in the CBGTI field.

Alternatively, C' may be calculated by using Equation 2 below instead of Equation 1.

$$C' = \sum_{i=0}^{mod(C,N_{CBG,max})-1} c_i \cdot \lceil C/N_{CBG,max} \rceil + \sum_{mod(C,N_{CBG,max})}^{N_{CBG,max}-1} c_i \cdot \lfloor C/N_{CBG,max} \rfloor \qquad \text{Equation 2}$$

In Equation 2, $N_{CBG,max}$ denotes a maximum CBG number per TB set from a BS and C denotes a number of CBs included in a TB. Here, $c_i$ may denote an i-th bit value from a CBGTI field.

Figure 11:
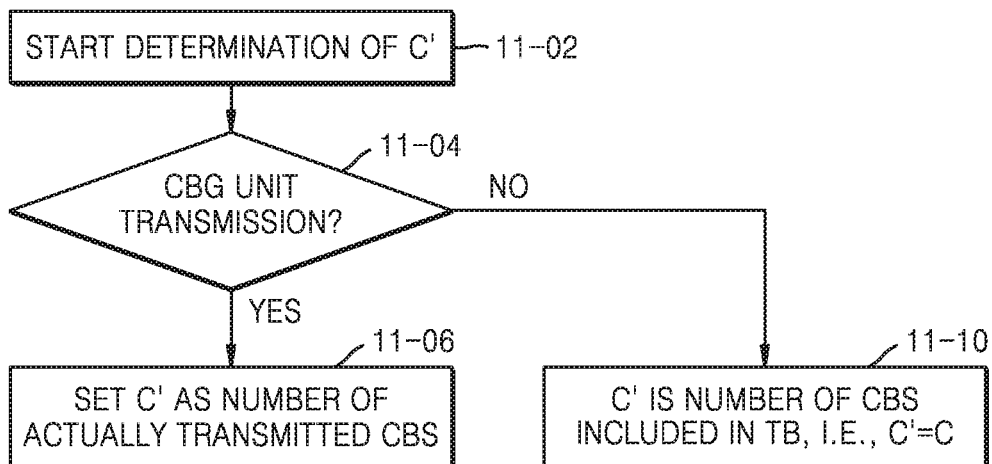
FIG. 11 is a flowchart of a method of determining a rate matching parameter, according to an embodiment of the disclosure.

FIG. 11 is a flowchart of a method of determining a rate matching parameter, according to another embodiment of the disclosure.

According to another embodiment, C' may be calculated in operation 1-1 according to the flowchart of FIG. 11. When a process of determining C' is started (11-02), it is determined whether transmission is CBG unit transmission based on information of scheduling DCI (11-04). The CBG unit transmission may be determined based on existence of a CBGTI field or based on a value of a 1-bit indicator of the DCI indicating CBG unit transmission or TB unit transmission. When the transmission is CBG unit transmission, C' is set as a number of actually scheduled CBs (11-06). When the transmission is not CBG unit transmission, and a TB is transmitted, C' is set as C (11-10), i.e., C' is set to the number of CBs included in the TB.

Figure 12:
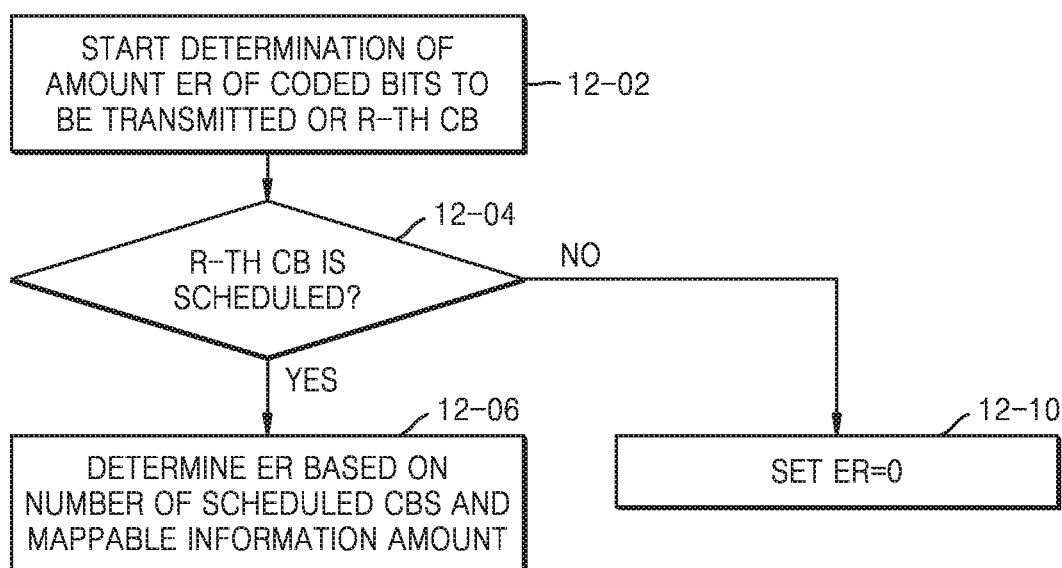
FIG. 12 is a flowchart of a method of determining a rate matching parameter, according to an embodiment of the disclosure.

FIG. 12 is a flowchart of a method of determining a rate matching parameter, according to another embodiment of the disclosure.

In operation 1-2 of pseudo-code 1, a process of determining Er may be performed according to the flowchart of FIG. 12. After an r-th CB in a TB is encoded with channel coding, an amount Er of coded bits to be transmitted is determined (12-02). While calculating Er, it is determined whether the r-th CB is scheduled (12-04). When the scheduling is not CBG unit retransmission but an entire TB is transmitted, it may be determined that all CBs have been scheduled. When the scheduling is CBG unit retransmission, it is determined whether the r-th CB is scheduled according to a CBGTI field. When the r-th CB is a scheduled CB, Er is determined based on a number C' of scheduled CBs and mappable information amounts G and G'(12-06). When the r-th CB is not scheduled, Er is set to Er=0 (12-10).

Pseudo-code 2 may be represented in the same manner as pseudo-code 1.

---

[Start pseudo-code 2]
- Operation 2-1: Set $^γ$ = mod(G',C'), where C is the number of CBs scheduled by a CBGTI field if it exists in a DCI, and where C is the number C of CBs computed by CB segmentation of a TB if the CBGTI field does not exist in the DCI.
- Operation 2-2:
Set j=0.
While(r<C) or while(r≤C−1)
If r-th CB is not scheduled, (conditional statement 2-2-1)
Er = 0
else (conditional statement 2-2-2),
If j ≤ C' − $^γ$ − 1 (conditional statement 2-2-3),
$E_r = N_L · Q_m · \lfloor G'/C' \rfloor$ and
j=j+1.
else (conditional statement 2-2-4), $E_r = N_L · Q_m · \lceil G'/C' \rceil$ and j=j+1.
End if
End if
End while
[End pseudo-code 2]

---

Here, after obtaining Er, a process of combining coded bits of CBs, which is performed in operation 9-09 of FIG. 9, may be performed as follows.

---

Set k = 0 and r = 0
while r < C
Set j = 0
while j < $E_r$
$g_k = f_{rj}$
k=k+1
j=j+1
end while
r=r+1
end while

---

Here, $f_{rk}$ denotes a k-th coded bit to be transmitted from an r-th CB, $g_k$ denotes information bits to be transmitted as coded bits of CBs are combined, and k is k=0, ..., G−1.

According to another embodiment, a method and apparatus for calculating a length of coded bits of each CB, which is rate-matched, when transmission is performed, are provided.

Referring to FIG. 9, when a TB to be transmitted is scheduled (9-01), a TBS of data to be transmitted is determined. Thereafter, a CRC is added to the TB, the TB is divided into CBs according to the TBS, and a CRC of a CB may be added (9-03). Channel code encoding is performed on each CB (9-05), and coded bits to be transmitted are determined (9-07). For example, the amount of coded bits to be transmitted is determined. Operation 9-07 may be referred to as rate-matching. Then, the coded bits to be transmitted from each CB are sequentially combined (9-09), and the combined bits are mapped to a physical channel and transmitted (9-12). According to an embodiment, in operation 9-07, a method of determining an amount of coded bits transmitted from each CB considering a number of actually transmitted CBs and an information bit amount transmittable in physical resources is provided.

[Start Rate-Matching Bit Number Determination or Transmission Bits Collection]

Operation 0: When CBGTI is included in scheduling DCI, C' denotes a number of CBs indicated by the CBGTI, and when CBGTI is not included in the scheduling DCI, C' denotes a number of CBs included in a scheduled TB. Here, it is to be noted that C' may not be the number of CBs included in the scheduled TB. When only a partial CBG is transmitted, C' may be smaller than the number of CBs included in the TB.

Operation 1: Er is defined such that a length of a rate-matching result of an r-th CB among scheduled CBs is indicated. Here, r=0, 1, ..., C−1.

Operation 2: G indicates information bits mappable for transmitting a TB. For example, G may be calculated according to the number of REs to which TB is mapped*modulation order*a layer number. (G: total number of bits available for the transmission of one transport block)

Operation 3: $N_L$ is defined as the number of layers a TB is mapped onto and Q may denote the number of coded bits per QAM symbol. G' is a value obtained by dividing G by $N_L$ and Q, that is, $G'=G/(N_L·Q)$ Operation 4: By using the value obtained by dividing G' by C', Er that is an amount of resources where the coded bits of transmitted CBs are rate-matched is calculated.

Operation 5: Mapping information bits are configured such that coded bits of CB are mapped only by the value Er of the length of rate-matching result of CB, calculated in operation 4.

[End Rate-Matching Bit Number Determination or Transmission Bits Collection]

In the above operations, operation 4 may be applied according to pseudo-code 3 below.

---

[Start pseudo-code 3]
- Operation 3-1: Set $^γ$ = mod(G',C'). C' denotes a number of CBs scheduled and transmitted, which is determined from a CBGTI field and CB number information included in a TB, when the CBGTI field exists in scheduling DCI, and denotes a number of CBs inlcuded in the TB when the CBGTI field does not exist in the scheduling DCI.
- Operation 3-2:
if j ≤ C' − $^γ$ − 1 (conditional statement 1-2-3), execute
$E_r = N_L · Q_m · \lfloor G'/C' \rfloor$ and j=j+1.
if j > C' − $^γ$ − 1 (conditional statement 1-2-4), execute
$E_r = N_L · Q_m · \lceil G'/C' \rceil$ and j=j+1.
[End pseudo-code 3]

---

According to an embodiment, C' may be calculated in operation 3-1 according to the flowchart of FIG. 10. When a process of determining C' is started (10-02), C' is calculated based on a CBGTI field and a number C of CBs included in a TB (10-06) when DCI scheduling the TB includes the CBGTI field. When the scheduling DCI does not include the CBGTI field, C' is set to the number of CBs included in the TB, i.e., C'=C (10-10). Here, when the CBGTI field is not included in the scheduling DCI, CBG unit retransmission may not be set or a DCI format for a fall-back mode operation is used despite the CBG unit retransmission being set. Alternatively, when the CBG unit retransmission is set and the CBGTI field is included in the DCI, but a terminal is defined to ignore the CBGTI field to perform an operation defined in a fall-back mode, a method of setting C' to C may be applied.

As an example of operation 10-06, C' may be calculated according to Equation 1 or 2 above.

According to another embodiment, C' may be calculated in operation 3-1 according to the flowchart of FIG. 11. When a process of determining C' is started (11-02), it is determined whether transmission is CBG unit transmission based on information of scheduling DCI (11-04). The CBG unit transmission may be determined based on existence of a CBGTI field or based on a value of a 1-bit indicator of the DCI indicating CBG unit transmission or TB unit transmission. When the transmission is CBG unit transmission, C' is set as a number of actually scheduled CBs (11-06). When the transmission is not CBG unit transmission, and a TB is transmitted, C' is set as C (11-10), i.e., C' is set to the number of CBs included in the TB.

Pseudo-code 4 may be represented in the same manner as pseudo-code 3.

---

[Start pseudo-code 4]
- Operation 4-1: Set = mod(G',C'), where C is the number of code blocks scheduled by a CBGTI field if it exists in a DCI, and where C is the number C of code blocks computed by code block segmentation of a TB if the CBGTI field does not exist in the DCI.
- Operation 4-2:
  If j ≤ C' − − 1 (conditional statement 4-2-3),
  $E_r = N_L \cdot Q_m \cdot \lfloor G'/C' \rfloor$ and
  j=j+1
  else (conditional statement 4-2-4), $E_r = N_L \cdot Q_m \cdot \lceil G'/C' \rceil$ and j=j+1.
  End if
[End pseudo-code 4]

---

Here, after obtaining Er, a process of combining coded bits of CBs, which is performed in operation 9-09 of FIG. 9, may be performed as follows.

---

Set k = 0 and r = 0
while r < C
  Set j = 0
  while j < $E_r$
    $g_k = f_{rj}$
    k=k+1
    j=j+1
  end while
  r=r+1
end while

---

Here, $f_{rk}$ denotes a k-th coded bit to be transmitted from an r-th CB, $g_k$ denotes information bits to be transmitted as coded bits of CBs are combined, and k is k=0, . . . , G−1.

Figure 13:
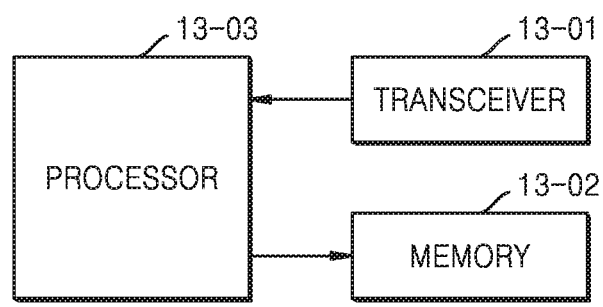
FIG. 13 is a block diagram of an internal configuration of a terminal, according to an embodiment of the disclosure.

FIG. 13 is a block diagram of a structure of a terminal, according to an embodiment of the disclosure.

Referring to the FIG. 13, the terminal may include a transceiver 13-01, a memory 13-02, and a processor 13-03. The transceiver 13-01, the memory 13-02, and the processor 13-03 of the terminal may operate according to a communication method of the terminal. However, not all of the illustrated components are essential. The terminal may be implemented by more or less components than those illustrated in FIG. 13. In addition, the transceiver 13-01, the memory 13-02, and the processor 13-03 may be implemented as a single chip.

The transceiver 13-01 may transmit or receive a signal to or from a BS. Here, the signal may include control information and data. In this regard, the transceiver 13-01 may include a RF transmitter for up-converting and amplifying a frequency of a transmitted signal, and a RF receiver for amplifying low-noise and down-converting a frequency of a received signal. However, components of the transceiver 13-01 are not limited to the RF transmitter and the RF receiver.

Also, the transceiver 13-01 may receive and output a signal via a wireless channel, and transmit a signal output from the processor 130-3 via a wireless channel.

The memory 13-02 may store a program and data required for operations of the terminal. Also, the memory 13-02 may store control information or data included in a signal obtained from the terminal. The memory 13-02 may be configured as a storage medium, such as read-only memory (ROM), random access memory (RAM), a hard disk, a CD-ROM, and a digital versatile disc (DVD), or a combination of storage media.

The processor 13-03 may control a series of processes such that the terminal operates according to embodiments described above. According to an embodiment, the processor 13-03 may receive DL control information including CB transmission information, and determine the number of CBs based on the CB transmission information. Also, the processor 13-03 may receive CBGTI information when the transceiver 13-01 receives a data signal from a BS, determine rate-matching based on the number of scheduled CBs, and perform a decoding process. Then, the transceiver 13-01 may transmit HARQ-ACK information according to a CBG to the BS.

Figure 14:
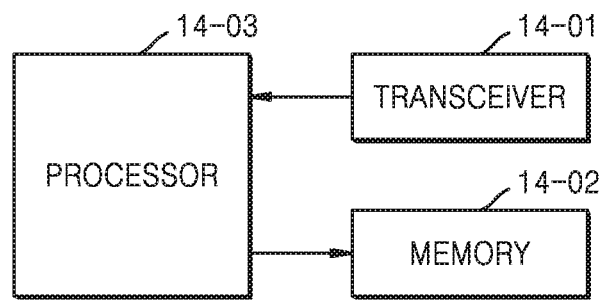
FIG. 14 is a block diagram of an internal configuration of a base station, according to an embodiment of the disclosure.

FIG. 14 is a block diagram of a structure of a BS, according to an embodiment of the disclosure.

Referring to FIG. 14, the BS may include a transceiver 14-01, a memory 14-02, and a processor 14-03. The transceiver 14-01, the memory 14-02, and the processor 14-03 of the BS may operate according to a communication method of the BS. However, not all of the illustrated components are essential. The BS may be implemented by more or less components than those illustrated in FIG. 14. In addition, the transceiver 14-01, the memory 14-02, and the processor 14-03 may be implemented as a single chip.

The transceiver 14-01 may transmit or receive a signal to or from a terminal. Here, the signal may include control information and data. In this regard, the transceiver 14-01 may include a RF transmitter for up-converting and amplifying a frequency of a transmitted signal, and a RF receiver for amplifying low-noise and down-converting a frequency of a received signal. However, components of the transceiver 14-01 are not limited to the RF transmitter and the RF receiver.

The transceiver 14-01 may receive and output, to the processor 14-03, a signal through a wireless channel, and transmit a signal output from the processor 14-03 through the wireless channel.

The memory 14-02 may store a program and data required for operations of the BS. The memory 14-02 may store control information or data included in a signal obtained by the BS. The memory 14-02 may be a storage medium, such as ROM, RAM, a hard disk, a CD-ROM, and a DVD, or a combination of storage media.

The processor 14-03 may control a series of processes such that the BS operates as described above. According to an embodiment, the processor 14-03 may generate DL control signal including CB transmission information, and transmit the DL control information to the terminal. Also, the processor 14-03 may determine the number of scheduled CBs, determine that each CB is rate-matched according to the number of scheduled CBs, and control data to be mapped to a physical resource. Then, the transceiver 14-01 may transmit related scheduling control information and data, and receive feedback information of CBGs.

According to one or more embodiments, a service may be smoothly provided in a wireless communication system.

Methods according to embodiments described in claims or specification of the disclosure may be implemented as hardware, software, or a combination of hardware and software.

When implemented as software, a non-transitory computer-readable storage medium storing at least one program (software module) may be provided. The at least one program stored in the non-transitory computer-readable storage medium is configured to be executable by one or more processors in an electronic device. The one or more processors include instructions causing the electronic device to execute the methods according to embodiments described in claims or specification of the disclosure.

The at least one program (the software module, the software) may be stored in a non-volatile including RAM and ROM, an electrically erasable programmable read-only memory (EEPROM), a magnetic disc storage device, CD-ROM, DVD, other optical storage devices, a magnetic cassette, or the like, or a memory configured of any or all combinations thereof. Also, each of configuration memories may be provided in a multiple number.

The at least one program may be stored in an attachable storage device that can be accessed via a communication network including internet, intranet, a local area network (LAN), a wide LAN (WLAN), or a storage area network (SAN), or a combination thereof. The storage device may access, via an external port, an apparatus for performing embodiments of the disclosure. Also, a separate storage device on a communication network may access the apparatus for performing embodiments of the disclosure.

In the embodiments of the disclosure, a component is expressed in a singular form or a plural form according to each specific embodiment. However, the singular or plural form is selected merely according to a suggested situation for convenience of description, and thus the disclosure is not limited by single or plural components. Thus, a plurality of components may be a single component, or a single component may be a plurality of components.

It should be understood that embodiments described herein should be considered in a descriptive sense only and not for purposes of limitation. Descriptions of features or aspects within each embodiment should typically be considered as available for other similar features or aspects in other embodiments. Also, the embodiments described above may operate in combination with each other as occasion demands. For example, a BS and a terminal may operate with some of the embodiments combined together. Also, the above embodiments are suggested based on an FDD LTE system, but other modifications based on the technical aspects of the embodiments may be possible for other systems, such as TDD LTE, 5G, and NR systems.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method, performed by a base station, of transmitting and receiving data in a wireless communication system, the method comprising:

identifying a code block (CB) among a plurality of CBs of a transport block (TB), scheduled for a transmission;
determining a length of a sequence for the identified CB;
generating the sequence for the CB according to the determined length of the sequence; and
transmitting a signal including the generated sequence,
wherein,
in case that code block group transmission information (CBGTI) is not present in downlink control information (DCI) scheduling the TB, the length of the sequence for the identified CB is determined based on a number of CBs of the TB, and
in case that the CBGTI is present in the DCI scheduling the TB, the length of the sequence for the identified CB is determined based on a number of scheduled CBs of the TB.

2. The method of claim 1, further comprising:
in case that the CB is not scheduled for the transmission, determining the length of a sequence for the CB as 0.

3. The method of claim 1, wherein the length of the sequence for the identified CB is determined as $$N_L \cdot Q_m \cdot \left\lfloor \frac{G}{N_L \cdot Q_m \cdot C'} \right\rfloor \text{ or } N_L \cdot Q_m \cdot \left\lceil \frac{G}{N_L \cdot Q_m \cdot C'} \right\rceil,$$

where
$N_L$ is a number of transmission layers mapped with the TB,
$Q_m$ is a modulation order,
$G$ is a total number of coded bits available for a transmission of the TB,
C' is the number of CBs of the TBs in case of CBGTI being not present in the DCI and
C' is the number of the scheduled CBs of the TBs in case of the CBGTI being present in the DCI.

4. A method, performed by a user equipment, of transmitting and receiving data in a wireless communication system, the method comprising:
receiving downlink control information (DCI) for scheduling a transport block (TB);
receiving a signal including a sequence for a code block (CB) among a plurality of CBs of the TB; and
identifying the CB, based on the sequence,
wherein,
in case that code block group transmission information (CBGTI) is not present in the downlink control information (DCI) scheduling the TB, a length of the sequence for the identified CB is determined based on a number of CBs of the TB, and
in case that the CBGTI is present in the DCI scheduling the TB, the length of the sequence for the identified CB is determined based on a number of scheduled CBs of the TB.

5. The method of claim 4, wherein in case that the CB is not scheduled for the transmission, the length of a sequence for the CB is determined as 0.

6. The method of claim 4, wherein the length of the sequence for the identified CB is determined as $$N_L \cdot Q_m \cdot \left\lfloor \frac{G}{N_L \cdot Q_m \cdot C'} \right\rfloor \text{ or } N_L \cdot Q_m \cdot \left\lceil \frac{G}{N_L \cdot Q_m \cdot C'} \right\rceil,$$

where
N_L is a number of transmission layers mapped with the TB,
Q_m is a modulation order,
G is a total number of coded bits available for a transmission of the TB,
C' is the number of CBs of the TBs in case of CBGTI being not present in the DCI and
C' is the number of the scheduled CBs of the TBs in case of the CBGTI being present in the DCI.

7. A base station in a wireless communication system, the base station comprising:
a transceiver; and
at least one processor configured to:
identify a code block (CB) among a plurality of CBs of a transport block (TB), scheduled for a transmission,
determine a length of a sequence for the identified CB,
generate the sequence for the CB according to the determined length of the sequence, and
transmit, via the transceiver, a signal including the generated sequence,
wherein,
in case that code block group transmission information (CBGTI) is not present in downlink control information (DCI) scheduling the TB, the length of the sequence for the identified CB is determined based on a number of CBs of the TB, and
in case that the CBGTI is present in the DCI scheduling the TB, the length of the sequence for the identified CB is determined based on a number of scheduled CBs of the TB.

8. The base station of claim 7, wherein the at least one processor is further configured to:
in case that the CB is not scheduled for the transmission, determine the length of a sequence for the CB as 0.

9. The base station of claim 7, wherein the length of the sequence for the identified CB is determined as $$N_L \cdot Q_m \cdot \left\lfloor \frac{G}{N_L \cdot Q_m \cdot C'} \right\rfloor \text{ or } N_L \cdot Q_m \cdot \left\lceil \frac{G}{N_L \cdot Q_m \cdot C'} \right\rceil,$$

where
N_L is a number of transmission layers mapped with the TB,
Q_m is a modulation order,
G is a total number of coded bits available for a transmission of the TB,
C' is the number of CBs of the TBs in case of CBGTI being not present in the DCI and
C' is the number of the scheduled CBs of the TBs in case of the CBGTI being present in the DCI.

10. A user equipment (UE), in a wireless communication system, the UE comprising:
a transceiver; and
at least one processor configured to:
receive, via the transceiver, downlink control information (DCI) for scheduling a transport block (TB),
receive, via the transceiver, a signal including a sequence for a code block (CB) among a plurality of CBs of the TB, and
identify the CB, based on the sequence,
wherein,
in case that code block group transmission information (CBGTI) is not present in the downlink control information (DCI) scheduling the TB, a length of the sequence for the identified CB is determined based on a number of CBs of the TB, and
in case that the CBGTI is present in the DCI scheduling the TB, the length of the sequence for the identified CB is determined based on a number of scheduled CBs of the TB.

11. The UE of claim 10, wherein in case that the CB is not scheduled for the transmission, the length of a sequence for the CB is determined as 0.

12. The UE of claim 10, wherein the length of the sequence for the identified CB is determined as $$N_L \cdot Q_m \cdot \left\lfloor \frac{Q}{N_L \cdot Q_m \cdot C'} \right\rfloor \text{ or } N_L \cdot Q_m \cdot \left\lceil \frac{G}{N_L \cdot Q_m \cdot C'} \right\rceil,$$

where
N_L is a number of transmission layers mapped with the TB,
Q_m is a modulation order,
G is a total number of coded bits available for a transmission of the TB,
C' is the number of CBs of the TBs in case of CBGTI being not present in the DCI and
C' is the number of the scheduled CBs of the TBs in case of the CBGTI being present in the DCI.

* * * * *